(12) United States Patent
Kochi et al.

(10) Patent No.: US 7,715,644 B2
(45) Date of Patent: May 11, 2010

(54) IMAGE CALIBRATION METHOD, IMAGE CALIBRATION PROCESSING DEVICE, AND IMAGE CALIBRATION PROCESSING TERMINAL

(75) Inventors: Nobuo Kochi, Tokyo (JP); Takayuki Noma, Tokyo (JP)

(73) Assignee: Topcon Corporation, Tokyo (JP)

( * ) Notice: Subject to any disclaimer, the term of this patent is extended or adjusted under 35 U.S.C. 154(b) by 1334 days.

(21) Appl. No.: 10/527,999

(22) PCT Filed: Sep. 18, 2003

(86) PCT No.: PCT/JP03/11899

§ 371 (c)(1),
(2), (4) Date: Jul. 15, 2005

(87) PCT Pub. No.: WO2004/027708

PCT Pub. Date: Apr. 1, 2004

(65) Prior Publication Data

US 2005/0261849 A1 Nov. 24, 2005

(30) Foreign Application Priority Data

Sep. 19, 2002 (JP) .............................. 2002-272858

(51) Int. Cl.
*G06K 9/36* (2006.01)
(52) U.S. Cl. ........................ 382/254; 382/291; 382/307
(58) Field of Classification Search ................. 382/209, 382/291, 307
See application file for complete search history.

(56) References Cited

U.S. PATENT DOCUMENTS 6,192,735 B1 * 2/2001 Nagai .......................... 73/1.82
6,351,573 B1 * 2/2002 Schneider .................... 382/294
6,816,625 B2 * 11/2004 Lewis et al. .................. 382/275
6,817,982 B2 * 11/2004 Fritz et al. .................... 600/443
6,874,420 B2 * 4/2005 Lewis et al. .................. 101/485

FOREIGN PATENT DOCUMENTS

| JP | 8-201021 A | 8/1996 |
|---|---|---|
| JP | 9-329418 A | 12/1997 |
| JP | 11-351865 A | 12/1999 |
| JP | 2002-27495 A | 1/2002 |
| JP | 2002-195058 A | 7/2002 |

* cited by examiner

*Primary Examiner*—Yosef Kassa
(74) *Attorney, Agent, or Firm*—Foley & Lardner LLP

(57) ABSTRACT

An image calibration method according to the present invention includes the steps of receiving a calibration request from a user terminal 20 (S10), receiving a calibration object image photographed in accordance with an instruction for calibration photographing (S16), performing a calibration process using the received calibration object image (S26), receiving a subject image photographed by a camera 2, transmitted from the user terminal 20 (S30), performing a calibration on the subject image in accordance with results of the calibration process to form a corrected subject image (S32), and returning the formed corrected subject image to the user terminal 20 (S34).

The present invention allows acquisition of a corrected subject image in which distortions due to the camera lens are corrected even for those unskilled in three-dimensional measurement based on the principle of the stereo method, precise two-dimensional measurement, and precise image formation.

18 Claims, 21 Drawing Sheets

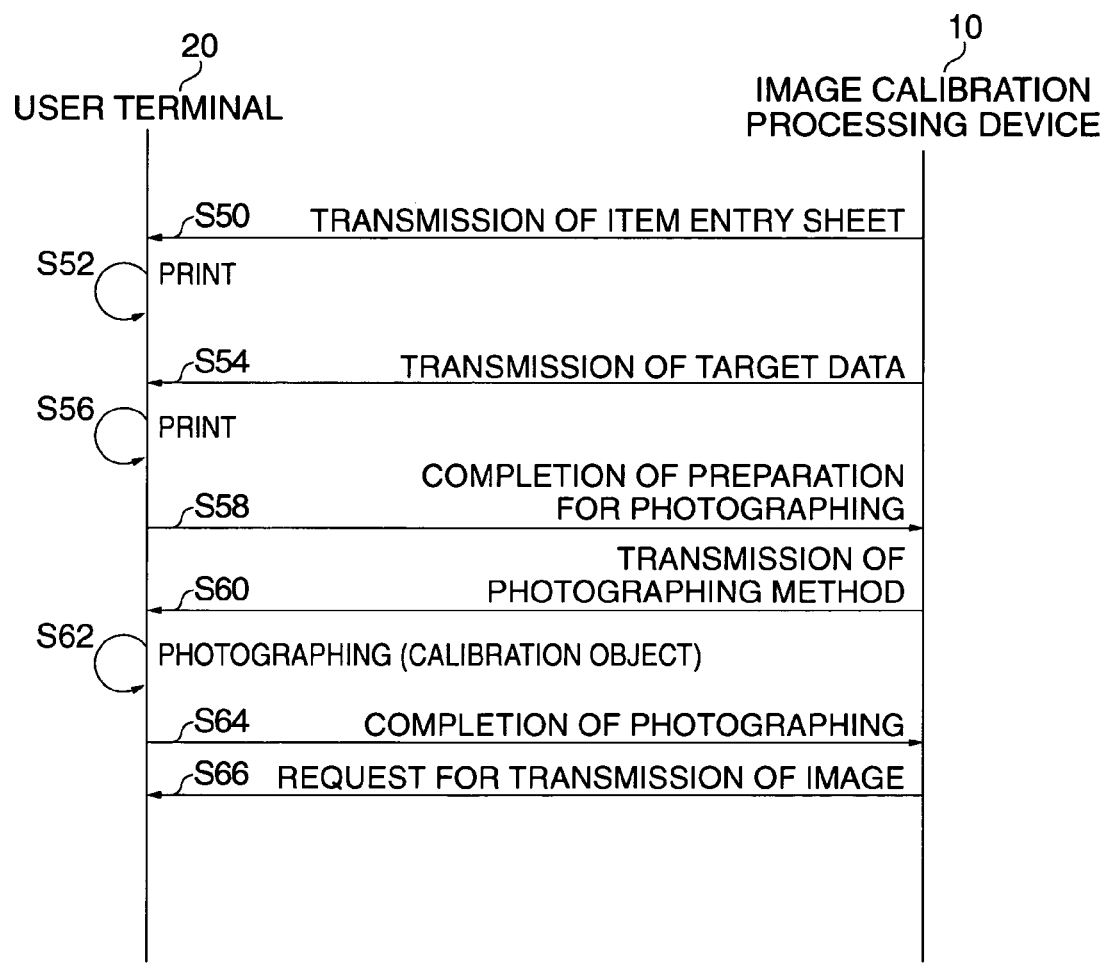

FIG. 7

DEFAULT CAMERA PARAMETERS CONFIGURATION

| DEFAULT CAMERA PARAMETERS CONFIGURATION | CORRECTION MODEL CONFIGURATION | OTHER CAMERA PARAMETERS CONFIRMATION |

Default camera file name (.cmr)  [Dimage7-tele]

For entry, refer to the instruction manual for the camera of use.

FOCAL LENGTH DEFAULT VALUE
Note: Do not enter value converted to the 35 mm film scale. Enter value of the camera/lens of use.
f = [48.5] [mm]

IMAGING DEVICE SIZES AND IMAGE RESOLUTIONS
Note: In case that information on plural items below are specified in the instruction manual, entry should be made on only one item with the priority order of 1 to 3.

1 ○ When image resolutions (size of one pixel of CCD) are specified or known:
   When imaging element sizes are specified
   Xr = [0] [um]  Yr = [0] [um]

IMAGING DEVICE SIZES ARE SPECIFIED
2 ○ in [mm] → [0] × [0] [mm]  (horizontal × vertical sizes)
3 ● in [inch] → [3] × [3] [inch]  (entry example: 1/1.7)

IMAGE RESOLUTIONS (calculated values)
Note: Values are automatically calculated and registered after image data is loaded.
Xr = [3.4] [um]  Yr = [3.4] [um]

Click OK button to save the default camera file.

[OK]  [CANCEL]  [APPLY (A)]  [HELP]

IMAGE CALIBRATION METHOD, IMAGE CALIBRATION PROCESSING DEVICE, AND IMAGE CALIBRATION PROCESSING TERMINAL

TECHNICAL FIELD

The present invention relates to an image calibration method of performing a camera calibration on an image photographed by a general camera to correct distortions due to the lens in the image photographed by the camera, and in particular to an image calibration method which does not impose precise calibration calculations on the side of a camera user.

The present invention also relates to an image calibration processing device capable of performing such precise calibration calculations as to allow, for example, stereo viewing. The present invention further relates to an image calibration processing terminal capable of transmitting an image photographed by a camera or photographing information on the camera to an image calibration processing device, and displaying a corrected subject image on which a calibration calculation has been performed.

BACKGROUND ART

Conventionally, when a plurality of single photographs are photographed and a panorama photograph is formed therefrom, it is necessary to correct the photographs to be combined so as to remove image distortions. Also, when an image photographed two-dimensionally is used to measure dimensions of an object, it is necessary to correct the photographed image so as to remove image distortions.

When a three-dimensional shape of a measuring object is measured based on two images photographed, measurement points on the measuring object are found based on the principle of a stereo method. In order to perform a three-dimensional measurement, a calibration of a camera, namely interior localizations (amount of lens distortions, focal length, and principal point position) of the camera, needs to be performed beforehand. Since the three-dimensional shape of the measuring object is found using the parallax between the images photographed by the camera, the distortions due to the camera lens used in the photographing need to be corrected very precisely.

[Patent Document 1]
JP-A-Hei09-329418 (Paragraphs 0006 and 0020, and FIG. 4 and FIG. 5)

[Patent Document 2]
JP-A-Hei11-351865 (Paragraphs 0002 and 0004, and FIG. 1 and FIG. 3)

DISCLOSURE OF THE INVENTION

Problem to be Solved by the Invention

However, performing a calibration of a camera as described above requires three-dimensional targets distributed over a wide range and measured accurately, an analysis software program, know-how for photographing, and the like. Therefore, the calibration work would be too complicated work for construction site or archaeological excavation site workers, clothing store clerks, or the like, for example. A calibration object suitable for calibration of a camera was disclosed by the present applicant in Patent Document 1 mentioned above. Even when such a calibration object is used, a software program for calibration needs to be purchased and the know-how on the photographing object, photographing method, and analysis is required. Therefore, formation of a panorama photograph by combining a plurality of single photographs, measurement of dimensions of an object using an image photographed two-dimensionally, or three-dimensional measurement based on the principle of a stereo method would evoke a great resistance to construction site or archaeological excavation site workers, clothing store clerks, or the like who are unskilled in those works.

The present invention has been made in view of the foregoing problems, and has a first object of providing an image calibration method that allows acquisition of a corrected subject image in which distortions due to the camera lens are corrected, even for those unskilled in three-dimensional measurement based on the principle of a stereo method, precise two-dimensional measurement, and precise image formation, such as construction site or archaeological excavation site workers, clothing store clerks, or the like.

A second object of the present invention is to provide an image calibration processing device that allows acquisition of a corrected subject image in which distortions due to the camera lens are corrected to such a degree as to allow three-dimensional measurement, precise two-dimensional measurement, and precise image formation in a concise manner.

A third object of the present invention is to provide an image calibration processing terminal that allows access to an image calibration processing device and acquisition of a corrected subject image in which distortions due to the camera lens are corrected in a concise manner.

Means for Solving the Problem

In order to achieve the first object, an image calibration method according to the present invention comprises, as shown for example in FIG. 1 and FIG. 2, the steps of: receiving, at an image calibration processing device 10, a calibration request from a user terminal 20 (S10); receiving, at the image calibration processing device 10, a calibration object image photographed in accordance with an instruction for calibration photographing (S16); performing a calibration process using the received calibration object image (S26); receiving, at the image calibration processing device 10, a subject image transmitted from the user terminal 20 and photographed by a camera 2 used to photograph the calibration object image (S30); performing a calibration on the subject image in accordance with results of the calibration process to form a corrected subject image (S32); and returning the formed corrected subject image from the image calibration processing device 10 to the user terminal 20.

According to an image calibration method including steps as described above, the image calibration processing device 10 receives a calibration object image photographed by the camera 2 as an object of calibration, performs a calibration process on the calibration object image received, and calculates the results of the calibration process necessary for correction of the lens distortions or the like. Then, the image calibration processing device 10 receives a subject image photographed by the camera 2, performs a calibration on the subject image in accordance with the results of the calibration process, and forms a corrected subject image. The corrected subject image is returned from the image calibration processing device 10 to the user terminal 20. In this manner, the user terminal 20 needs only to transmit a calibration object image photographed by the camera 2, and then a subject image photographed by the camera 2, to the image calibration processing device 10 in accordance with an instruction for calibration photographing. Meanwhile, the image calibration processing device 10 bears the burden of complicated calculation processing for a corrected subject image, thereby reducing the calculation load for the user terminal 20. Since the user terminal 20 is used at a work site or a travel destination, a light calculation load will reduce the power consumption and stabilize the workability of the user terminal 20.

Preferably, in the image calibration method as described above, as shown for example in FIG. 18 and FIG. 19, the calibration object image and the subject image are a common image in which a calibration object 4 and a subject 6 are photographed at a time, and the method further comprises the step of performing a three-dimensional measurement on the subject using the corrected subject image. Then, a three-dimensional image measurement on the subject can be performed. Thus, the image calibration processing device 10 can provide a three-dimensional image measurement to users who require it, as an additional service to the calibration process.

In order to achieve the first object, an image calibration method according to the present invention comprises, as shown for example in FIG. 14 and FIG. 15, the steps of: receiving, at an image calibration processing device 30, a calibration request from a user terminal 40 (S100); receiving, at the image calibration processing device 30, a calibration object image photographed in accordance with an instruction for calibration photographing (S106); performing a calibration process using the received calibration object image (S116); and transmitting results of the calibration process calculated in the calibration process from the image calibration processing device 30. And, the user terminal 40 performs a calibration on a subject image photographed by a camera used to photograph the calibration object image (S120), using the results of the calibration process transmitted from the image calibration processing device 30, to form a corrected subject image (S122).

According to an image calibration method including steps as described above, the image calibration processing device 30 receives a calibration object image photographed by the camera 2 as an object of calibration, performs a calibration process on the calibration object image received, and calculates the results of the calibration process necessary for correction of the lens distortions or the like. The calculated results are returned to the user terminal 40. Meanwhile, the user terminal 40 performs a calibration on a subject image photographed by the camera 2 using the results of the calibration process transmitted from the image calibration processing device 30, and forms a corrected subject image. Then, the user terminal 40 can obtain a corrected subject image from the subject image photographed by the camera 2, using the results of the calibration process obtained from the image calibration processing device 30. At this time, since the user terminal 40 bears the burden of calculation processing for a corrected subject image, a corrected subject image can be reliably obtained even in cases where a communication line between the user terminal 40 and the image calibration processing device 30 has a narrow bandwidth or is not stable.

Preferably, in the image calibration method as described above, as shown for example in FIG. 20 and FIG. 21, the calibration object image and the subject image are a common image in which a calibration object 4 and a subject 6 are photographed at a time, and the user terminal 40 is configured further to perform a three-dimensional measurement on the subject using the corrected subject image (S234).

Preferably, in the image calibration method as described above, the method further includes the step of transmitting the instruction for calibration photographing from the image calibration processing device (10, 30) to the user terminal (20, 40) (S12, S102). There may be cases where an instruction for calibration photographing is not carried to a site or a travel destination by mistake. In such cases, an instruction can be downloaded to the user terminal (20, 40) by making an access to the image calibration processing device (10, 30). Preferably, the instruction includes an image showing a photographing state. Such an image will facilitate understanding of photographing work for a calibration object image, for an operator who photographs a calibration object image by the camera 2 as an object of calibration.

Preferably, the image calibration method as described above includes the step of: receiving at the image calibration processing device (10, 30) at least a focal length in the photographing and a model of the camera, or a focal length in the photographing and a size of an imaging device used in the photographing, together with the calibration object image transmitted from the user terminal (20, 40) (S16, S106). The focal length in the photographing and the model of camera, or the focal length in the photographing and the size of an imaging device used in the photographing, are useful information for calibration processing.

Preferably, the image calibration method as described above includes the step of: reading, at the image calibration processing device (10, 30), data necessary for the calibration process from photographing information affixed to the calibration object image transmitted from the user terminal (20, 40) (S16, S106). The read data is used for the calibration process.

Preferably, in the image calibration method as described above, the results of the calibration process includes at least one of a principal point position, distortion data, and a focal length of a lens used in the photographing, of the camera involved in the photographing of the calibration object image. Then, parameters necessary for calculation processing for a corrected subject image can be obtained.

Preferably, the image calibration method as described above includes the step of: accumulating the calculated results of the calibration process in a calibration database (19, 39) when the image calibration processing device (10, 30) performs the calibration process using the received calibration object image. The results of the calibration process accumulated may be utilized, for example, in CRM (Customer Relation Management) or the like.

In order to achieve the first object, an image calibration method according to the present invention is, as shown for example in FIG. 12 and FIG. 13, used with an image calibration processing device 10 including a calibration database 19 in which results of a calibration process are accumulated according to a model of a camera. That is, the method comprises the steps of: receiving, at the image calibration processing device 10, a calibration request from a user terminal 20, together with a model of a camera 2 used to photograph the subject image (S10, S11b); retrieving, from the calibration database 19, results of the calibration process corresponding to the received model of the camera; performing a calibration on the calibration object image using the retrieved results of the calibration process to form a corrected subject image (S32); and returning the formed corrected subject image from the image calibration processing device 10 to the user terminal 20.

According to an image calibration method including steps as described above, the results of the calibration process are accumulated beforehand in the calibration database 19 according to the model of the camera 2 as an object of calibration. Since the image calibration processing device 10 receives a calibration request from the user terminal 20, together with the model of the camera 2 used to photograph the subject image, results of the calibration process accumulated in the calibration database 19 and corresponding to the model of the camera 2 can be read. In cases where the model of the camera 2 and the results of the calibration process correspond to each other within a certain tolerable range, the results of the calibration process accumulated in the calibration database 19 and corresponding to the model of the camera 2 can be used and the calibration object image photographed in accordance with an instruction for calibration photographing does not need to be used. Thus, the user terminal 20 does not need to transmit the calibration object image photographed by the camera 2 to the image calibration processing device 10, and the image calibration processing device 10 does not need to calculate the results of the calibration process necessary for correction of the lens distortions or the like, thereby allowing the work to go smoothly.

In order to achieve the first object, an image calibration method according to the present invention is, as shown for example in FIG. 16 and FIG. 17, used with an image calibration processing device 30 including a calibration database 39 in which results of a calibration process are accumulated according to a model of a camera. That is, the method comprises the steps of: receiving, at the image calibration processing device 30, a calibration request from a user terminal 40, together with a model of a camera 2 used to photograph a subject image (S100, S101b); retrieving, from the calibration database 39, results of the calibration process corresponding to the received model of the camera (S101c); and transmitting the retrieved results of the calibration process from the image calibration processing device 30 (S118). And, the user terminal 40 performs a calibration on the subject image using the results of the calibration process transmitted from the image calibration processing device 30, to form a corrected subject image (S122).

According to an image calibration method including steps as described above, the results of the calibration process are accumulated beforehand in the calibration database 39 according to the model of the camera 2 as an object of calibration. Thus, in cases where the model of the camera 2 and the results of the calibration process correspond to each other within a certain tolerable range, the results of the calibration process accumulated in the calibration database 39 and corresponding to the model of the camera 2 can be used and the calibration object image photographed in accordance with an instruction for calibration photographing does not need to be used. Also, the user terminal 40 can obtain a corrected subject image from the subject image photographed by the camera 2, using the results of the calibration process obtained from the image calibration processing device 30. At this time, since the user terminal 40 bears the burden of calculation processing for a corrected subject image, a corrected subject image can be reliably obtained even in cases where a communication line between the user terminal 40 and the image calibration processing device 30 has a narrow bandwidth or is not stable.

In the image calibration method above, preferably the calculated results of the calibration process are accumulated in the calibration database (19, 39), together with the model of camera, when a calibration process is performed using the calibration object image received from the user terminal (20, 40).

In order to achieve the first object, an image calibration method according to the present invention comprises, as shown for example in FIG. 1 and FIG. 2, the steps of: transmitting a calibration request to an image calibration processing device 10 from a user terminal 20 (S10); transmitting a calibration object image photographed by a predetermined camera 2 in accordance with an instruction for calibration photographing from the user terminal 20 to the image calibration processing device 10 (S16); transmitting a subject image photographed by the camera 2 used to photograph the calibration object image to the image calibration processing device 10 (S30); and receiving, at the user terminal, a corrected subject image transmitted from the image calibration processing device 10 and formed by performing a calibration on the subject image in accordance with results of a calibration process obtained using the transmitted calibration object image (S34).

In order to achieve the first object, an image calibration method according to the present invention, as shown for example in FIG. 14 and FIG. 15, comprises the steps of: transmitting a calibration request to an image calibration processing device 30 from a user terminal 40 (S100); transmitting a calibration object image photographed by a predetermined camera 2 in accordance with an instruction for calibration photographing from the user terminal 40 to the image calibration processing device 30 (S106); receiving at the user terminal 40 results of a calibration process calculated by the image calibration processing device 30 (S118); and performing a calibration on a subject image photographed by the camera 2 used to photograph the calibration object image using the received results of the calibration process, to form a corrected subject image (S122).

In order to achieve the second object, an image calibration processing device 10 according to the present invention, comprises, as shown for example in FIG. 1, a receiving section for user terminal 11 for receiving a use request for image calibration transmitted from a user terminal 20, a calibration object image photographed in accordance with an instruction for calibration photographing, and a subject image photographed by a camera used to photograph the calibration object image; a calibration processing section 14 for performing a calibration process using the calibration object image received by the receiving section for user terminal 11; a corrected subject image forming section 15 for performing a calibration on the subject image in accordance with results of the calibration process to form a corrected subject image; and a transmission section for user terminal 16 for returning the corrected subject image formed by the corrected subject image forming section 15 to the user terminal 20.

Preferably, the image calibration processing device 10 according to the present invention further comprises: a display section 16a for displaying the corrected subject image formed by the corrected subject image forming section 15. Preferably, in the image calibration processing device 10, as shown for example in FIG. 18, the calibration object image and the subject image are a common image in which a calibration object and a subject are photographed at a time, and the device comprises a three-dimensional measurement section 15a for performing a three-dimensional measurement on the subject using the corrected subject image.

In order to achieve the second object, an image calibration processing device 30 according to the present invention comprises, as shown for example in FIG. 14, a receiving section for user terminal 31 for receiving a use request for image calibration transmitted from a user terminal 40 and a calibration object image photographed in accordance with an instruction for calibration photographing; a calibration processing section for performing a predetermined calibration process on the calibration object image received by the receiving section for user terminal 31; and a transmission section for user terminal 36 for returning results of the calibration process calculated by the calibration processing section 34 to the user terminal 40. And, the user terminal 40 performs a calibration on a subject image photographed by a camera used to photograph the calibration object image using the results of the calibration process transmitted from the transmission section for user terminal 36, to form a corrected subject image.

Preferably, in the image calibration processing device 30 according to the present invention, as shown for example in FIG. 20, the calibration object image and the subject image are a common image in which a calibration object 4 and a subject 6 are photographed at a time, and the user terminal 40 is configured to further include a three-dimensional measurement section 47 performing a three-dimensional measurement on the subject using the corrected subject image.

Preferably, the image calibration processing device (10, 30) according to the present invention further comprises: an instruction retrieving section (13, 33) for retrieving the instruction suitable for the use request for image calibration received by the receiving section for user terminal (11, 31), and the transmission section for user terminal (16, 36) is configured to return the instruction retrieved by the instruction retrieving section (13, 33) to the user terminal (20, 40). Preferably, the instruction described above further includes an image showing a photographing state. Such an image will facilitate understanding for a person in charge of photographing a calibration object image and a subject image.

Preferably, in the image calibration processing device (1.0, 30) according to the present invention, the receiving section for user terminal (11, 31) is configured to receive at least a focal length in the photographing and a model of the camera, or a focal length in the photographing and a size of an imaging device used in the photographing, together with the calibration object image or the subject image transmitted from the user terminal (20, 40). The focal length in the photographing and the model of the camera, or the focal length in the photographing and the size of an imaging device used in the photographing, are useful information for calibration processing.

Preferably, the image calibration processing device (10, 30) according to the present invention includes an information reading section (14b, 34b) for reading data necessary for the calibration process from photographing information affixed to the calibration object image transmitted from the user terminal (20, 40). The data read by the information reading section is used for the calibration process by the calibration processing section (14, 34). Preferably, in the image calibration processing device (10, 30) according to the present invention, the calibration processing section (14, 34) is configured to calculate results of the calibration process including at least one of a principal point position, distortion data, and a focal length of a lens used in the photographing, of the camera involved in the photographing of the subject image.

In order to achieve the second object, an image calibration processing device 10 according to the present invention comprises, as shown for example in FIG. 12, a receiving section for user terminal 11 for receiving a calibration request and a subject image from a user terminal 20, together with a model of a camera 2 used to photograph the subject image; a calibration database 19 in which results of a calibration process are accumulated according to a model of a camera 2; a calibration process results retrieving section 14a for retrieving, from the calibration database 19, results of the calibration process corresponding to the received model of the camera; a corrected subject image forming section 15 for performing a calibration on the subject image transmitted from the user terminal 20 using the retrieved results of the calibration process, to form a corrected subject image; and a transmission section for user terminal 16 for returning the formed corrected subject image to the user terminal 20.

In order to achieve the second object, an image calibration processing device 30 comprises, as shown for example in FIG. 16, a receiving section for user terminal 31 for receiving a calibration request from a user terminal 40, together with a model of a camera 2 used to photograph a subject image; a calibration database 39 in which results of a calibration process are accumulated according to a model of a camera; a calibration process results retrieving section 34a for retrieving, from the calibration database 39, results of the calibration process corresponding to the received model of the camera; and a transmission section for user terminal 36 for transmitting the retrieved results of the calibration process to the user terminal 40. And, the user terminal 40 is configured to perform a calibration on the subject image using the results of the calibration process transmitted from the transmission section for user terminal 36, to form a corrected subject image.

In order to achieve the third object, an image calibration processing terminal 20 comprises, as shown for example in FIG. 1, a transmission section for processing device 21 for transmitting a use request for image calibration, a calibration object image photographed in accordance with an instruction for calibration photographing, and a subject image photographed by a camera 2 used to photograph the calibration object image, to an image calibration processing device 10; a receiving section for processing device 24 for receiving a corrected subject image transmitted from the image calibration processing device 10 and formed by performing a calibration on the subject image; and a display section 25 for displaying the corrected subject image received by the receiving section for processing device 24.

In order to achieve the third object, an image calibration processing terminal comprises, as shown for example in FIG. 14, a transmission section for processing device 41 for transmitting a use request for image calibration, and a calibration object image photographed in accordance with an instruction for calibration photographing, to an image calibration processing device 30; a receiving section for processing device 44 for receiving results of a calibration process transmitted from the image calibration processing device 30; and a corrected subject image forming section 46 for performing a calibration on a subject image photographed by a camera 2 used to photograph the calibration object image using the results of the calibration process received by the receiving section for processing device 44, to form a corrected subject image.

EFFECT OF THE INVENTION

According to an image calibration method of the present invention, an image calibration processing device, located away from a user terminal, performs a calibration process on a camera, by performing the steps of receiving a calibration object image photographed in accordance with an instruction for calibration photographing with an image calibration processing device, and performing a calibration process using the calibration object image received. Since a calibration is performed on a subject image photographed by the camera used to photograph the calibration object image in accordance with the results of the calibration process, to form a corrected subject image, a corrected subject image in which influences of the lens aberrations of the camera are compensated can be easily obtained.

Also, an image calibration method of the present invention includes the steps of transmitting information on the model of a camera used to photograph a subject image from a user terminal to an image calibration processing device having a calibration database in which the results of a calibration process are stored according to the model of camera, and retrieving results of the calibration process corresponding to the model of the camera received from the calibration database. Therefore, if the results of the calibration process retrieved can be applied to a subject image from the camera, a user of the camera can easily obtain a corrected subject image without the need to photograph a calibration object image in accordance with an instruction for calibration photographing.

The basic Japanese Patent Application No. 2002-272858 filed on Sep. 19, 2002 is hereby incorporated in its entirety by reference into the present application.

The present invention will become more fully understood from the detailed description given hereinbelow. The other applicable fields will become apparent with reference to the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiments. Among the disclosed changes and modifications, those which may not fall within the scope of the present claims constitute, therefore, a part of the present invention in the sense of doctrine of equivalents.

BRIEF DESCRIPTION OF THE DRAWINGS

FIG. 6 is a flowchart showing the details of instructions used to photograph a calibration object image.

FIG. 7 illustrates an example of an item entry sheet.

BEST MODE FOR CARRYING OUT THE INVENTION

First Embodiment

Figure 1:
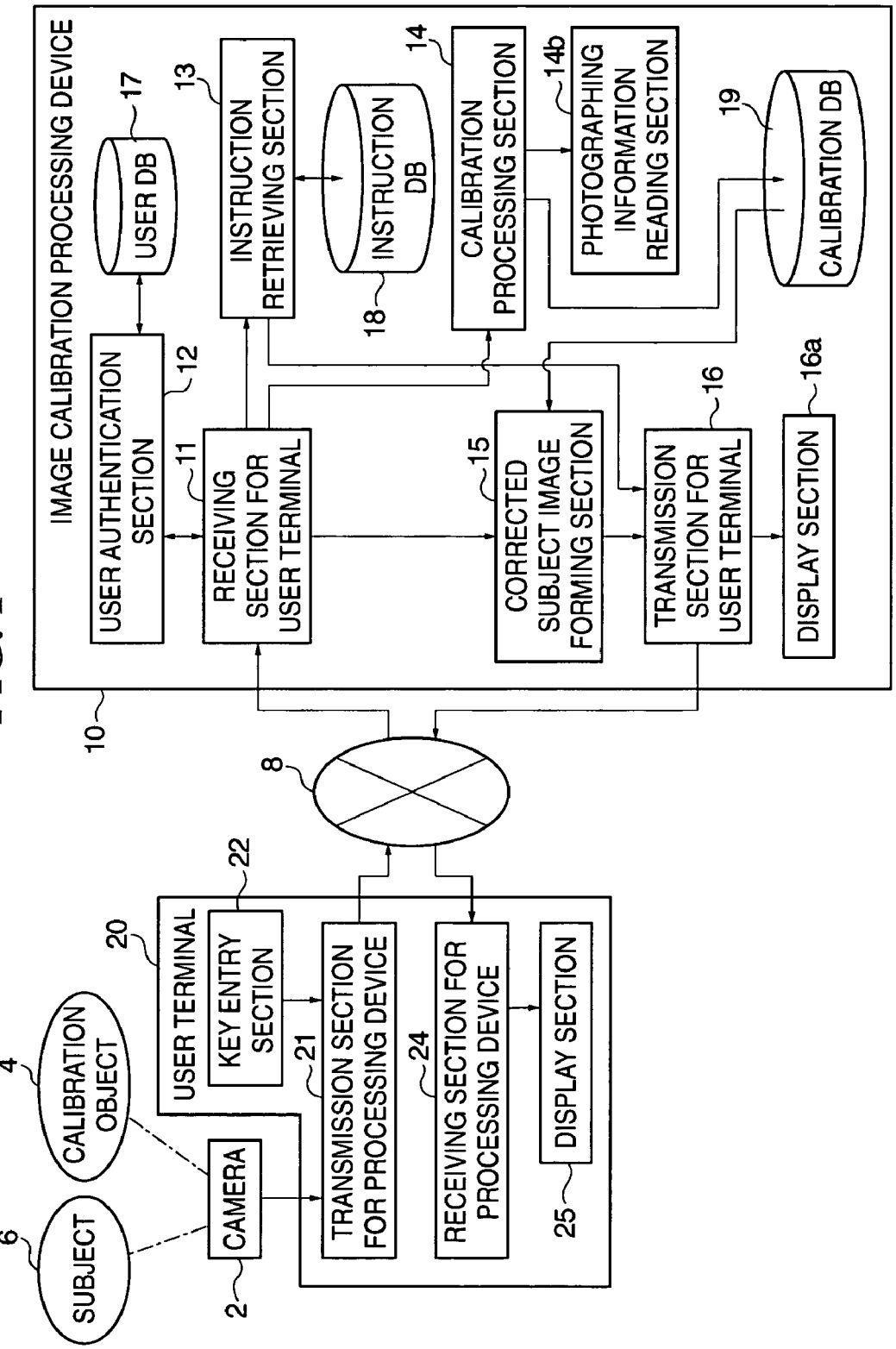
FIG. 1 is a general block diagram illustrating the structure of a first embodiment of the present invention.

The present invention is described below with reference to the drawings. FIG. 1 is a general block diagram illustrating the structure of a first embodiment of the present invention. As shown in the figure, an image calibration processing system of the present invention includes a camera 2, a calibration object 4, a subject 6, a communication line 8, an image calibration processing device 10, and a plurality of user terminals 20. The camera 2 is an optical instrument with relatively large lens aberrations such as, for example, a general-purpose single-lens reflex camera or digital camera, compared to cameras for high-precision measurement purposes. The calibration object 4 is a chart used to perform a calibration to compensate the lens aberrations, and may be a three-dimensional chart or a two-dimensional chart. A three-dimensional chart has reference points, of which respective two-dimensional positions and heights have been precisely found. A two-dimensional chart will be described in detail later. The subject 6 is an object to be photographed by the camera 2, and may be a subject for a panoramic photograph (for example a landscape) or a subject for two-dimensional or three-dimensional measurement (for example a work piece, a geographical feature, or the like). The communication line 8 may be a public line or a dedicated line, either wired or wireless, which allows data communication.

The image calibration processing device 10 includes a receiving section for user terminal 11, a user authentication section 12, an instruction retrieving section 13, a calibration processing section 14, an information reading section 14b, a corrected subject image forming section 15, a transmission section for user terminal 16, a display section 16a, a user database 17, an instruction database 18, and a calibration database 19. An instrument with a high calculation capacity such as, for example, a server or a workstation may be used as the image calibration processing device 10.

The receiving section for user terminal 11 receives, via the communication line 8, a use request for image calibration, a calibration object image photographed in accordance with an instruction for calibration photographing, and a subject image of the subject 6 photographed by the camera 2 transmitted from a user terminal 20. The calibration object image and the subject image are basically images in which the calibration object 4 or the subject 6, respectively, is individually photographed by the common camera 2. The use request for image calibration may conveniently include photographing condition information useful for calibration processing, such as a model or focal length of the camera, and/or the like. The photographing condition information may be transmitted as independent data, or included as supplementary information in the calibration object image or the subject image. For example, a basic format adopted for digital cameras called "Exif" includes, at the beginning of the format, photographing condition information such as a photographing instrument, date, aperture, shutter speed, and the like used in the photographing.

The user authentication section 12 is used by an operator of the image calibration processing device 10 to certify a user of the user terminal 20 as having a proper title for use. The user authentication section 12 uses, for example, an address and name of the user, a number of a telephone line utilized as the communication line 8, an authentication key distributed by the image calibration processing device 10, and/or the like. The user database 17 has registered therein users of the user terminals 20 with a proper title for use. The user database 17 stores a registration date, a valid period of membership registration, and a number of times of use in cases where a membership system is adopted, or an accounting status in cases where a pay system is adopted. When the user authentication section 12 has certified a user of the user terminal 20 as having a proper title for use, the use request for image calibration received by the receiving section for user terminal 11 can then be dealt with.

The instruction retrieving section 13 retrieves, from the instruction database 18, an instruction for calibration photographing suitable for the use request for image calibration received by the receiving section for user terminal 11. When an instruction for calibration photographing is already available to the user of the user terminal 20, the instruction retrieving section 13 may not retrieve one. The instruction database 18 stores instructions for calibration photographing according to the model of the camera 2 and/or the type of the calibration object 4. The models of the camera 2 may include, for example, a zoom lens, a wide-angle lens, a telephoto lens, a panoramic lens, a standard lens, and/or the like. The types of the calibration object 4 may include, for example, a two-dimensional chart, a three-dimensional chart, and/or the like.

The calibration processing section 14 performs a calibration process using the calibration object image received by the receiving section for user terminal 11. The calibration process is performed to find various parameters used to compensate the camera aberrations, and will be described in detail later. The information reading section 14b reads data necessary for the calibration process from the photographing information affixed to the calibration object image transmitted from the user terminal 20. The information reading section 14b reads, for example, the photographing information included in the basic format for digital cameras "Exif." The calibration database 19 has accumulated therein results of the calibration process according to the model or the lens focal length of the camera 2.

The corrected subject image forming section 15 performs a calibration on the subject image received by the receiving section for user terminal 11 in accordance with the calibration process, to form a corrected subject image. The transmission section for user terminal 16 transmits, via the communication line 8, the instruction retrieved by the instruction retrieving section 13 and the corrected subject image formed by the corrected subject image forming section 15 to the user terminal 20. The display section 16a may be a CRT or liquid crystal display screen. The display section 16a displays the corrected subject image formed by the corrected subject image forming section 15, the results of the calibration process by the calibration processing section 14, the calibration object image and the subject image received by the receiving section for user terminal 11, and/or the like.

The image calibration processing terminal 20 of the present invention includes a transmission section for processing device 21, a key entry section 22, a receiving section for processing device 24, and a display section 25. A personal computer, a personal digital assistant, or a mobile phone terminal with a built-in camera, for example, may be used as the image calibration processing terminal 20. The transmission section for processing device 21 and the receiving section for processing device 24 may be provided with a modem for connection to the communication line 8. The transmission section for processing device 21 transmits, via the communication line 8, a use request for image calibration, a calibration object image photographed in accordance with an instruction for calibration photographing, and a subject image photographed by the camera 2 used to photograph the calibration object image, to the image calibration processing device 10. The use request for image calibration may be transmitted together with authentication information indicating that the user has a proper title for use, and/or the photographing condition information.

The key entry section 22 is used when the user inputs alphanumeric, kana, and other operating commands, and may be formed with, for example, a keyboard, a touch panel utilizing the display section 25, a push button, and/or the like. The receiving section for processing device 24 receives the corrected subject image formed by performing a calibration on the subject image and transmitted from the image calibration processing device 10. The receiving section for processing device 24 also receives, via the communication line 8, an instruction for calibration photographing, when necessary. The display section 25 displays the instruction for calibration photographing and the corrected subject image received by the receiving section for processing device 24. The display section 25 may display a calibration object image or a subject image.

Figure 2:
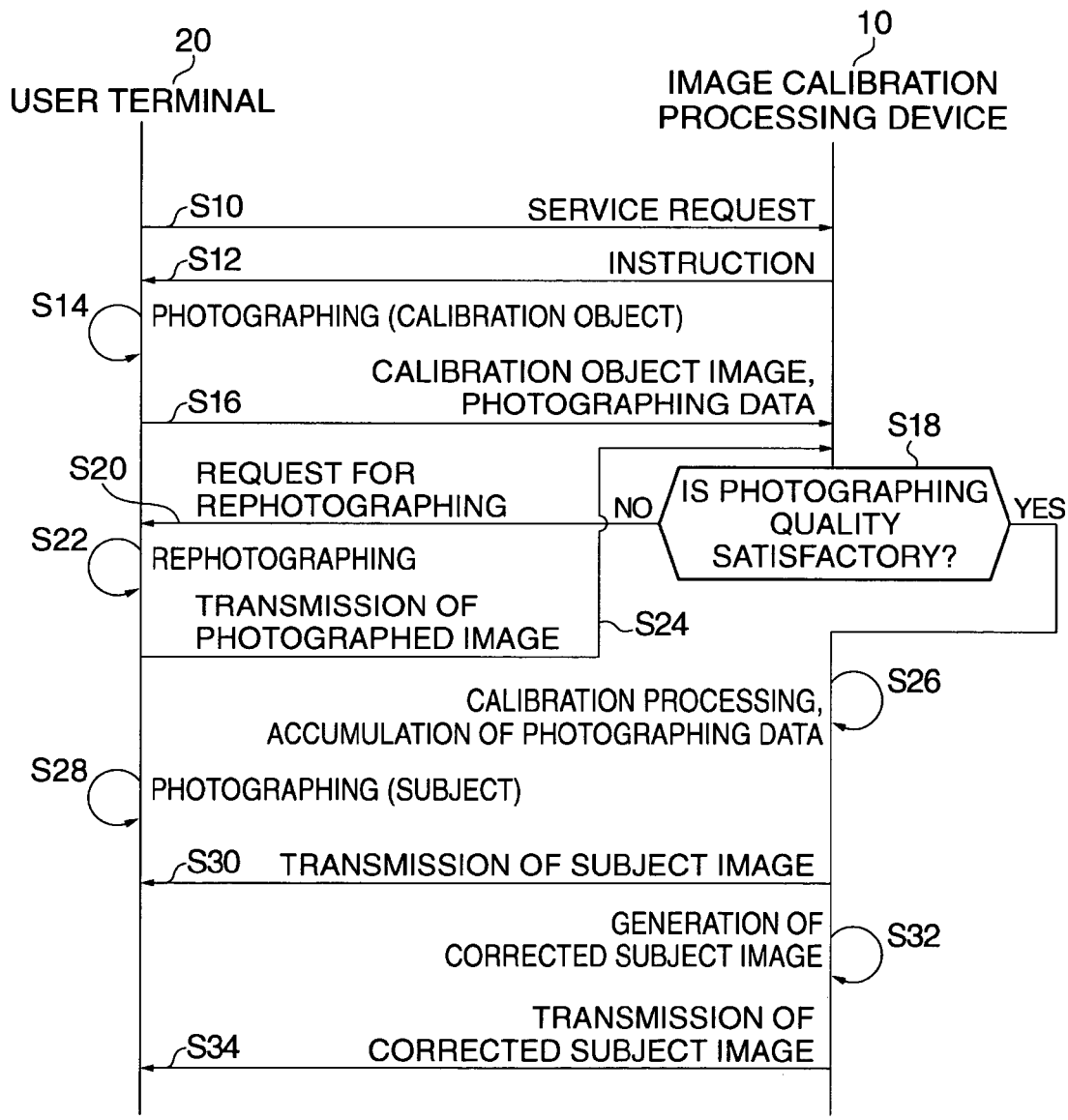
FIG. 2 is a flowchart for illustrating a method of the first embodiment of the present invention.

The operation of an apparatus constituted as described above will be described. FIG. 2 is a flowchart for illustrating a method of the first embodiment of the present invention. A user terminal 20 transmits a calibration request (service request) for the camera 2 to the image calibration processing device 10 via the communication line 8 (S10). In response to the calibration request, the image calibration processing device 10 authenticates whether or not a user of the user terminal 20 has a proper title for use. When the user of the user terminal 20 is certified as having a proper title for use as a result of authentication, the image calibration processing device 10 returns an instruction for calibration photographing according to the model of the camera 2 to the user terminal 20 (S12). The instruction for calibration photographing may be accompanied by, for example, a two-dimensional chart as the calibration object 4. In cases where the user terminal 20 has a three-dimensional chart as the calibration object 4, the three-dimensional chart may be used, instead of the two-dimensional chart transmitted, as the calibration object 4.

On the user terminal 20 side, the calibration object 4 is photographed by the camera 2 in accordance with the instruction for calibration photographing (S14). The calibration object image photographed is transmitted from the user terminal 20 to the image calibration processing device 10 via the communication line 8, together with the photographing data (S16). The image calibration processing device 10 makes a determination on the photographing quality of the calibration object image transmitted, for example, as to whether or not the image is unsuitable for the calibration process because the image is out of focus or the calibration object 4 image is too small (S18). If the calibration object image is determined to be unsuitable, rephotographing of the calibration object 4 by the camera 2 is requested (S20). At this time, it should be advantageous to give a comment suggesting to what should be paid attention in order to obtain a calibration object image suitable for the calibration process. In response to the request for rephotographing, the user photographs the calibration object 4 by the camera 2 (S22), while paying attention to what is suggested in the comment. The calibration object image photographed is transmitted from the user terminal 20 to the image calibration processing device 10 via the communication line 8, together with the photographing data (S24), and a determination is made on the photographing quality of the calibration object image in S18.

If the photographing quality of the calibration object image is suitable, the calibration processing section 14 performs a calibration process using the calibration object image received (S26). The results of the calibration process are accumulated in the calibration database 19, together with the model of the camera. On the user terminal 20 side, the subject 6 is photographed by the camera 2 used to photograph the calibration object image (S28). The user terminal 20 transmits the subject image to the image calibration processing device 10 via the communication line 8 (S30). The image calibration processing device 10 performs a calibration on the subject image received, in accordance with the results of the calibration process obtained in S26, to form a corrected subject image (S32). The corrected subject image formed is returned from the image calibration processing device 10 to the user terminal 20 (S34).

The image calibration processing device 10 may make a determination on the photographing quality of the subject image transmitted at this time. For example, a determination may be made as to whether or not the image is unsuitable for the correction process because the image is out of focus or the subject 6 image is too small. If the subject image is determined to be unsuitable, rephotographing of the subject 6 by the camera 2 is requested. In cases of a pay service, a process necessary for accounting is performed as use information is accumulated in the user database 17.

Figure 3:
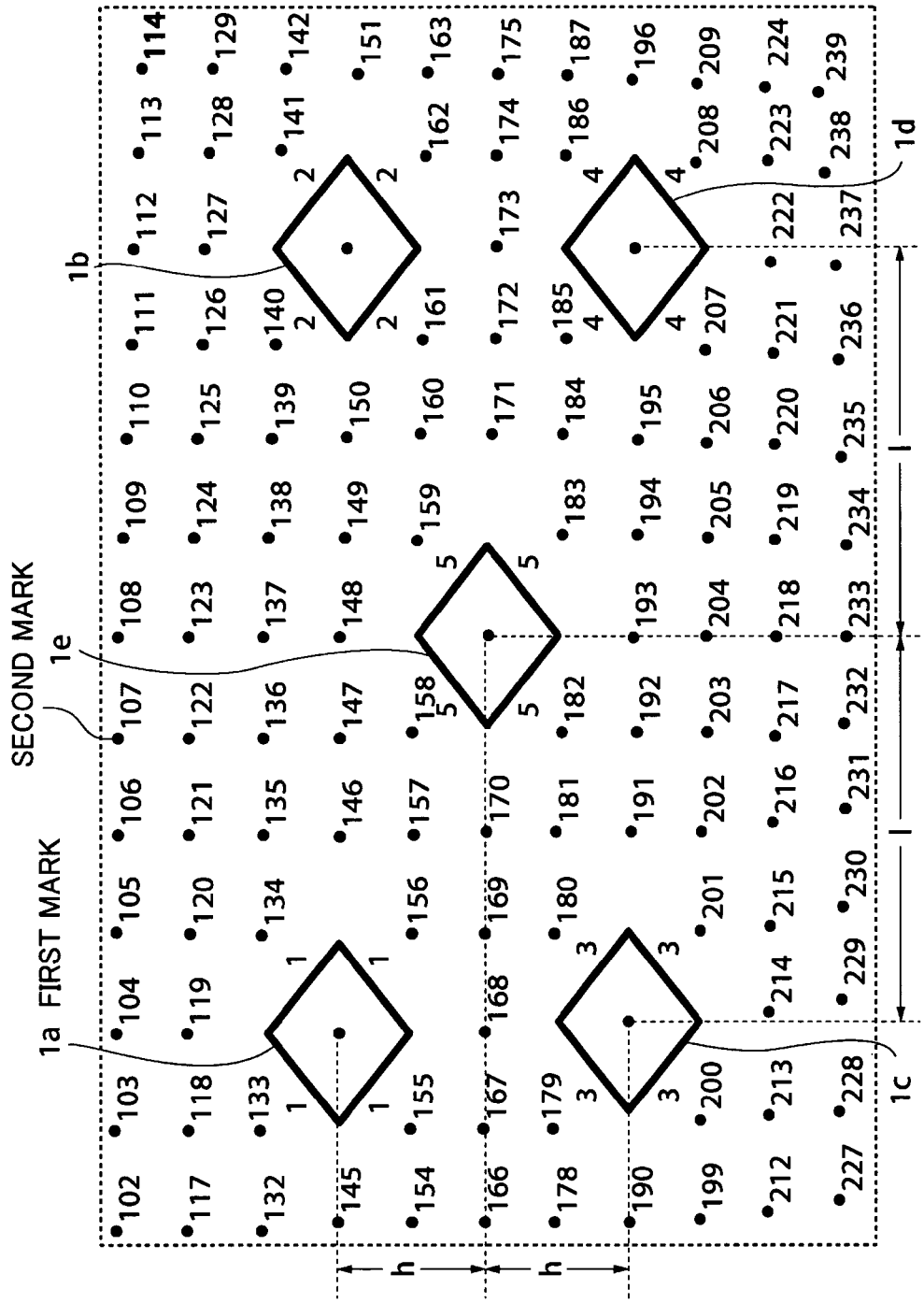
FIG. 3 is a plan view showing an example of a two-dimensional chart.

The two-dimensional chart as the calibration object 4 is described. Here, the two-dimensional chart is exemplified by a sheet of paper or plastic on which predetermined marks are printed. However, the two-dimensional chart can be a flat screen on which an image with predetermined marks are arranged. FIG. 3 is a plan view showing an example of the two-dimensional chart. The two-dimensional chart is shaped as a flat sheet. Viewable first marks and second marks constituted of a plurality of dots are printed on the front side of the two-dimensional chart. The first marks are used in the calibration process, and also used to determine the photographing angle at which the camera 2 photographs the two-dimensional chart. The first marks are provided at least three locations on the two-dimensional chart, and preferably provided respectively in the four quadrants equally dividing the two-dimensional chart. The second marks, which may also be referred to as targets, are used to designate the position of the image data on the two-dimensional chart photographed by the camera 2. Preferably, the second marks are distributed with a uniform density all over the two-dimensional chart. The second marks are provided preferably at 30 locations or more, and more preferably at about 100-200 locations, on the two-dimensional chart.

In this example, the two-dimensional chart has a total of five first marks arranged thereon, which have a diamond external shape and a mark at its center used commonly as the second mark. The first marks 1a, 1b, 1c, and 1d are respectively provided in the four quadrants dividing the two-dimensional chart. The first mark 1a is located in the upper left quadrant, 1b in the upper right quadrant, 1c in the lower left quadrant, and 1d in the lower right quadrant. The first mark 1e is provided at the origin common to all the quadrants. For example, the first marks 1a, 1b, 1c, and 1d are positioned at an equal distance d from the first mark 1e. Here, an assumption is made that the two-dimensional chart is rectangular, the vertical interval between the first mark 1a, 1b and the first mark 1e is h, and the horizontal interval between the first mark 1c, 1d and the first mark 1e is 1. On this assumption, the distance d between the first mark 1a, 1b, 1c, 1d and the first mark 1e satisfies the following relation:

$$d=(h^2+l^2)^{1/2} \tag{1}$$

The first marks and the second marks should beforehand be printed so as to conform to desired dimensions, or subjected to a measurement of dimensions. The positions of the first marks and the second marks may conveniently be stored in the calibration database 19 beforehand, to allow them to be printed on a sheet so as to conform to the stored coordinates.

Figure 4:
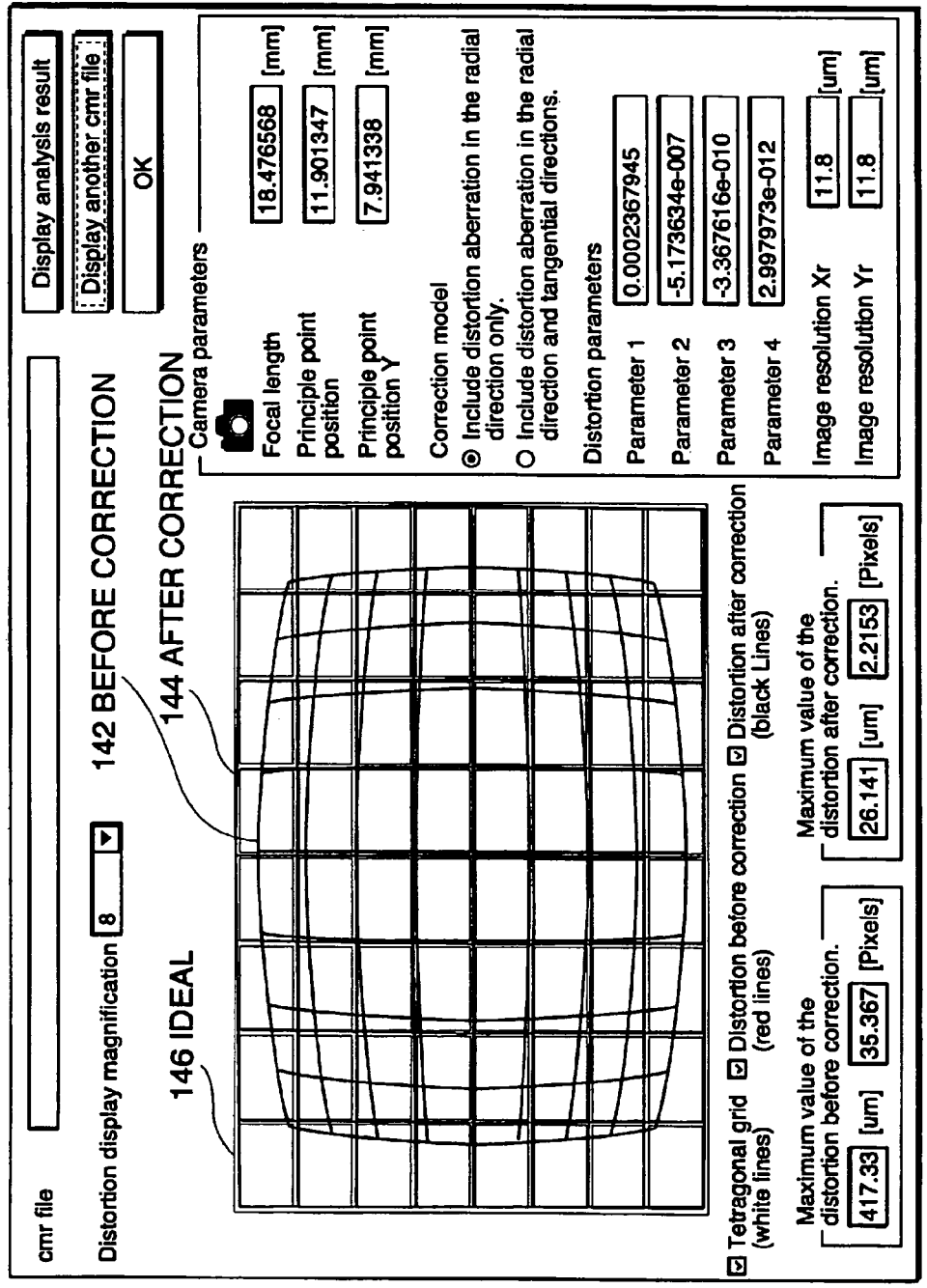
FIG. 4 is a view illustrating an example of the results of a calibration process.

FIG. 4 is a view illustrating an example of the results of the calibration process. The display section 16a may display, for example, a focal length, a principal point position, and distortion parameters as calibration elements. As for the distortion indicating the lens aberrations, a curve before correction 142, a curve after correction 144, and an ideally corrected curve 146 may be displayed in graphical form for easy understanding.

Figure 5:
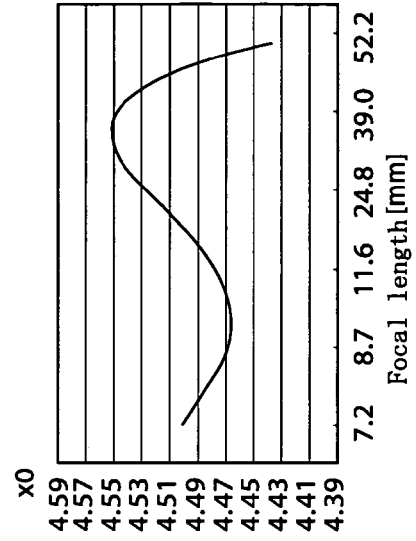
FIG. 5 is a view illustrating an example of the results of the calibration process performed on a zoom lens.
Figure 5:
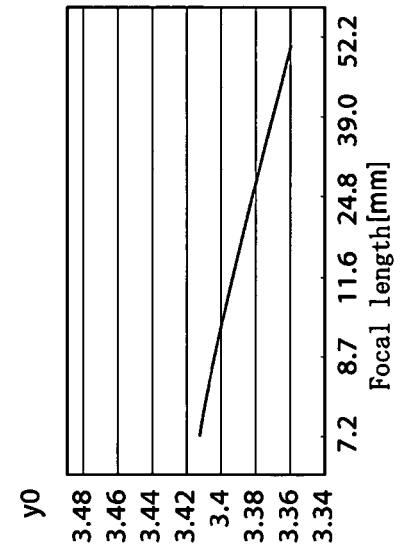
Figure 5:
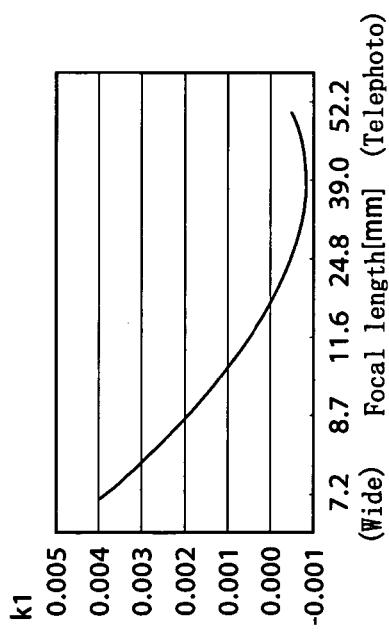
Figure 5:
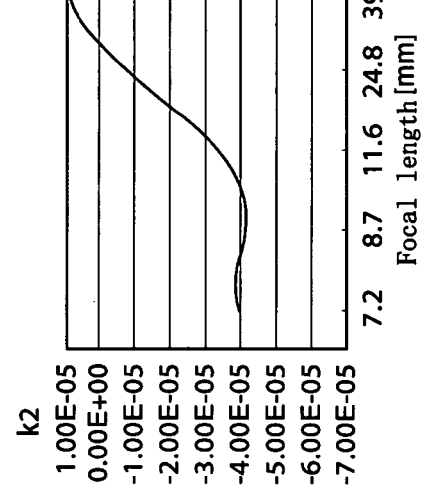

FIG. 5 shows an example of the results of the calibration process performed on a zoom lens, where (A) shows a coefficient k1, (B) a coefficient k2, (C) an x-axis deviation coefficient x0 for an x-axis deviation between the camera principal point and the image center in an image coordinate system x, and (D) a y-axis deviation coefficient y0 for a y-axis deviation between the camera principal point and the image center in an image coordinate system y. Here, the focal length of the zoom camera 2 is assumed to be adjustable from 7.2 mm to 50.8 mm. With the number of measurement points for focal length data being six, 7.2 mm and 52.2 mm are respectively used as the most wide-angle and most telephoto measurement points, and 8.7 mm, 11.6 mm, 24.8 mm, and 39.0 mm are selected as intermediate measurement points uniformly distanced in terms of optics. The coefficients k1 and k2 will be used in the equation (4) for a bundle adjusting method with self-calibration described later, and take maximum values on the most wide-angle side and smaller values on the most telephoto side.

FIG. 6 is a flowchart showing the outline of the instructions used to photograph a calibration object image, illustrating the details at the calibration request (service request) stage. The image calibration processing device 10 transmits an item entry sheet to the user terminal 20 (S50). The item entry sheet includes items necessary for the calibration process, such as whether a two-dimensional chart or an existing three-dimensional chart is used as a photographing target as the calibration object 4.

The user terminal 20 prints or displays the item entry sheet transmitted (S52), to allow entry or addition of the necessary items such as the camera 2, calibration object 4, subject 6, and photographing conditions. Upon request from the user terminal 20, a two-dimensional chart as the calibration object 4 is transmitted (S54). The user terminal 20 prints or displays the two-dimensional chart as the calibration 4 transmitted (S56). The user terminal 20 returns the item entry sheet after entering or adding the photographing conditions and/or the like to the image calibration processing device 10, to signal the completion of preparation for photographing (S58). At this time, on the user terminal 20 side, the printed two-dimensional chart should be affixed on a wall, or the display section 25 of the user terminal 20 should be placed in an appropriate position to display the two-dimensional chart transmitted. Depending on the camera angle as a photographing condition or the desired correction precision, the two-dimensional chart transmitted in S56 may not be satisfactory in terms of precision. In such a case, only a two-dimensional chart precisely printed or a three-dimensional chart precisely fabricated could attain the precision required for the corrected subject image, and therefore another two-dimensional chart or three-dimensional chart necessary has to be waited for to be mailed or transmitted.

The image calibration processing device 10 transmits an instruction for calibration photographing corresponding to the model of the camera 2 to the user terminal 20 (S60). The instruction may be transmitted as a batch file, or transmitted sequentially in real time as the photographing progresses like "streaming". On the user terminal 20 side an image of the calibration object 4 is photographed by the camera 2, in accordance with the instruction for calibration photographing (S62). When the photographing of the calibration object has been completed, the user terminal 20 transmits a photographing completion signal to the image calibration processing device 10 (S64). The image calibration processing device 10 prepares for the reception of the calibration object image, and then transmits an image transmission request signal to the user terminal 20 (S66).

FIG. 7 illustrates an example of the item entry sheet, showing a sheet screen to be transmitted online. The item entry sheet screen is provided with a default camera parameters configuration screen, a correction model configuration screen, and an other camera parameters confirmation screen. The default camera parameters configuration screen is provided with entry sections for a focal length default value, and an imaging device sizes and image resolutions.

Figure 8:
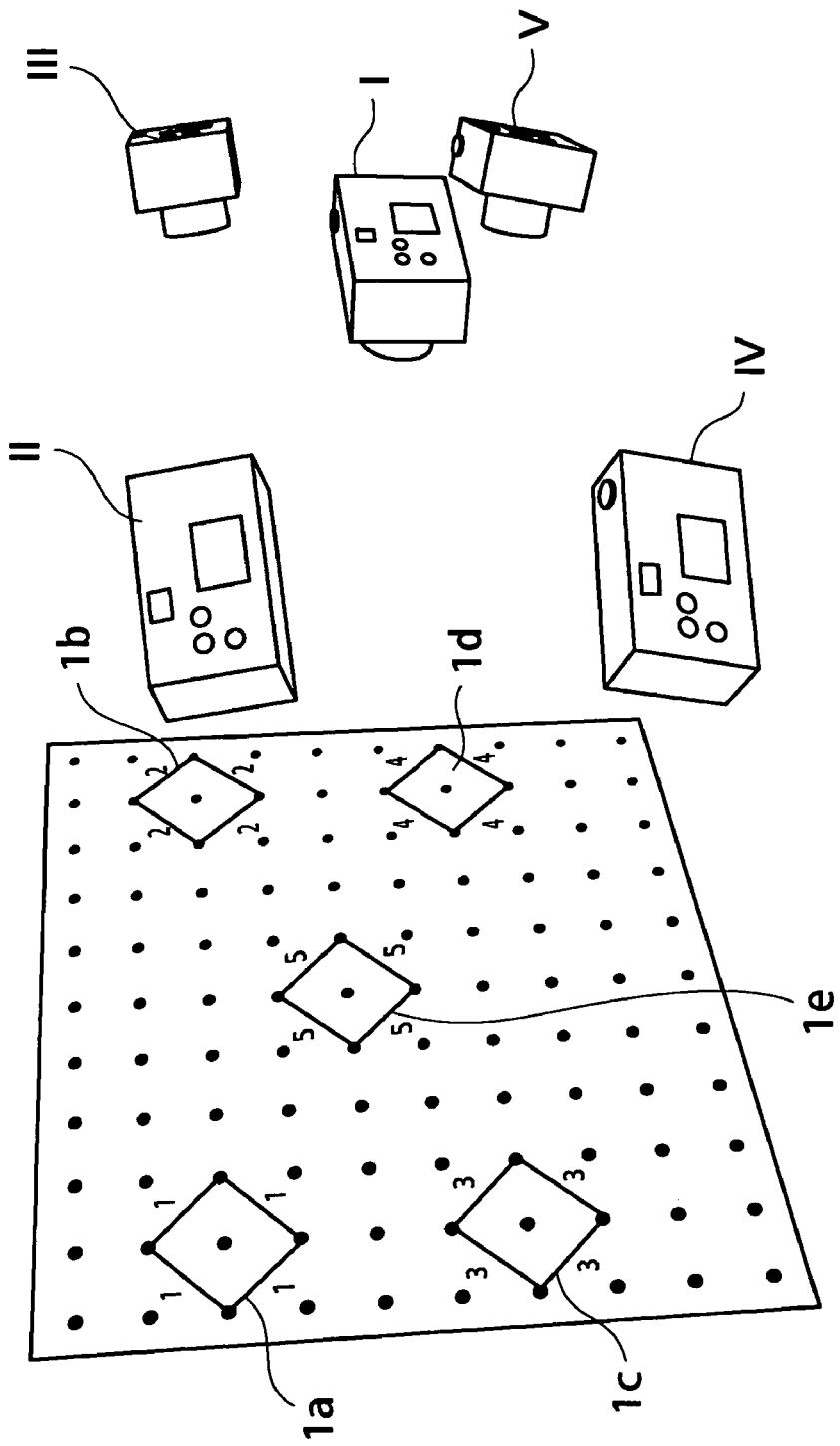
FIG. 8 is a perspective view illustrating an arrangement of a camera when measuring the lens aberrations at various focal lengths of the camera.

A description is made of a procedure for photographing the two-dimensional chart by means of the camera 2, as an instruction for calibration photographing. FIG. 8 is a perspective view illustrating an arrangement of a camera when measuring the lens aberrations at various focal lengths of the camera. Performing a calibration may be possible when two or more images of the two-dimensional chart photographed from different directions are available. In cases where a two-dimensional chart printed on a sheet is used, preferably the two-dimensional chart is photographed from three or more directions. In this manner, even for wide-angle lenses with a short focal length, measurement values for the respective calibration elements, in particular for the focal length, can be stable and reliable.

FIG. 8 shows a procedure where the photographing is performed from five directions, namely the very front (I), the upper left (II), the upper right (III), the lower left (IV), and the lower right (V). With the depth precision at the actual photographing site set at about 1 cm, the photographing incident angle between the optical axis of the camera 2 and the two-dimensional chart is preferably in the range of 10 degrees-30 degrees, and more preferably in the range of 12 degrees-20 degrees, considering the in-focus distance associated with the focal depth of the lens being limited. Typically, the photographing incident angle between the optical axis of the camera 2 and the two-dimensional chart may conveniently be 15 degrees. The various focal lengths typically refer to focal lengths equivalent to a standard lens, a wide-angle lens, and a telephoto lens used for a single-lens reflex camera.

Figure 9:
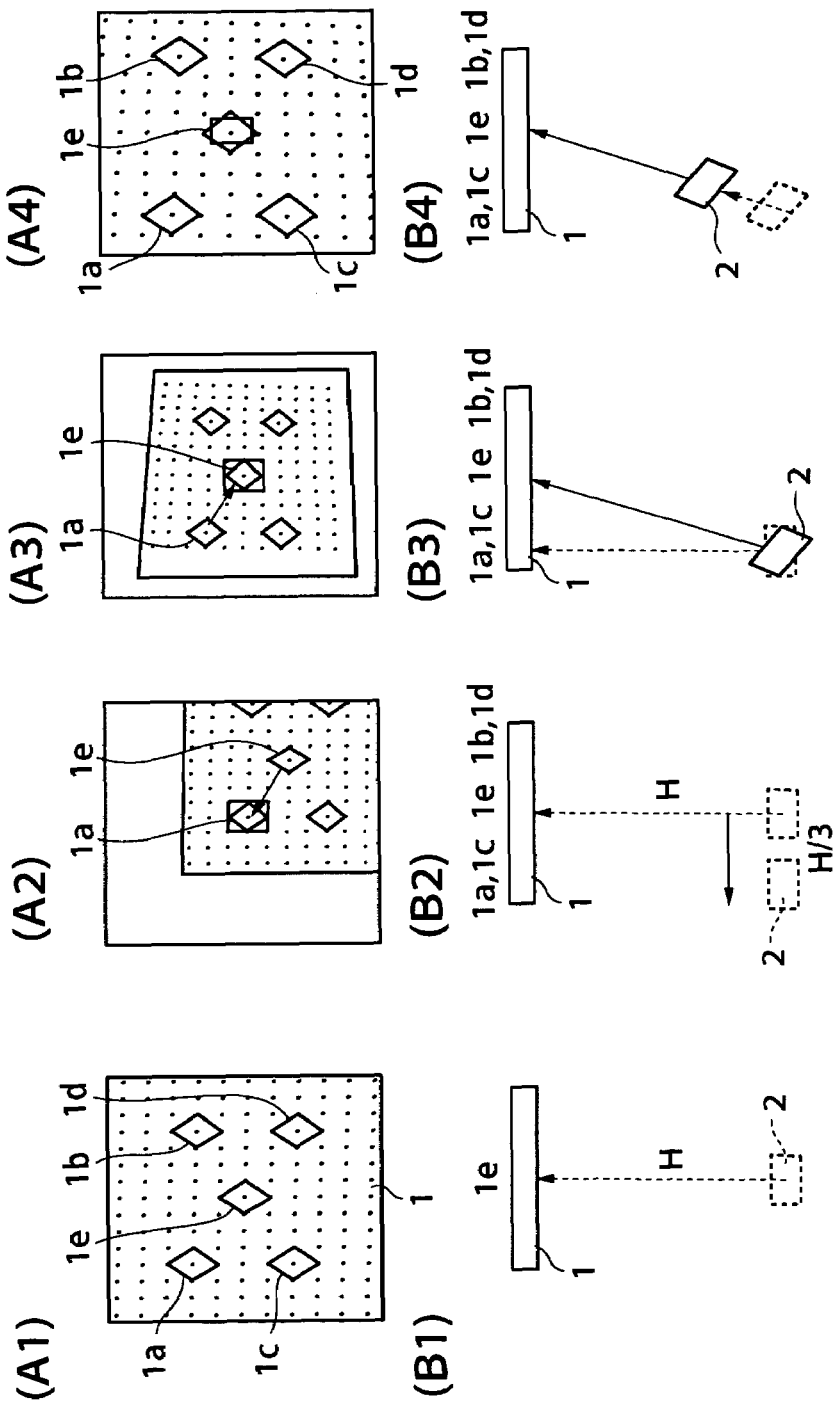
FIG. 9 illustrates a procedure for photographing the two-dimensional chart by means of the camera, where (A1), (A2), (A3), and (A4) show an image from the camera, and (B1), (B2), (B3), and (B4) show positional relation between the two-dimensional chart and the camera 2 corresponding to the image from the camera.

With reference to FIG. 9, a description is made of a procedure for photographing the two-dimensional chart by means of the camera. In FIG. 9, (A1), (A2), (A3), and (A4) show an image from the camera, and (B1), (B2), (B3), and (B4) show positional relation between the two-dimensional chart and the camera 2 corresponding to the image from the camera. The numbers (I)-(V) correspond to the camera positions shown in FIG. 8.

(I): The two-dimensional chart is photographed from the very front such that all the first marks and the second marks on the two-dimensional chart are distributed all over but still included in the resulting image (FIG. 9 (A1) and (B1)). By allowing the first marks and the second marks to be distributed all over the photographed image to corners thereof, distortion correction can be securely performed to peripheral portions of the lens. The photographing distance H varies depending on the focal length of the camera.

(II): Then, in cases where the focal length of the zoom camera is equivalent to a telephoto lens or a standard lens, the camera is moved to a position about one third of the photographing distance H away from the very front camera position. That is, the camera position is changed such that the first mark $1a$ in the upper left quadrant, for example, comes to the photographing center (FIG. 9 (A2) and (B2)). However, in cases where the focal length of the zoom camera is equivalent to a wide-angle lens and the photographing distance H is about 1 m or less, the camera 2 can simply be moved such that the target first mark comes to the very front of the camera 2. While keeping the camera 2 in the same position, the camera 2 is directed such that the central first mark $1e$ comes to the center of the resulting image (FIG. 9 (A3) and (B3)). The camera 2 is then moved closer to the two-dimensional chart such that the first marks and the second marks are distributed all over the image photographed by the camera 2 (FIG. 9 (A4) and (B4)).

(III): The camera position is changed such that the first mark $1b$ in the upper right quadrant comes to the photographing center. While keeping the camera in the same position, the camera is directed such that the central first mark $1e$ comes to the center of the resulting image, to perform photographing with the first marks and the second marks distributed all over the resulting image.

(IV): The camera position is changed such that the first mark $1c$ in the lower left quadrant comes to the photographing center. While keeping the camera in the same position, the camera is directed such that the central first mark $1e$ comes to the center of the resulting image, to perform photographing with the first marks and the second marks distributed all over the resulting image.

(V): The camera position is changed such that the first mark $1d$ in the lower right quadrant comes to the photographing center. While keeping the camera in the same position, the camera is directed such that the central first mark $1e$ comes to the center of the resulting image, to perform photographing with the first marks and the second marks distributed all over the resulting image.

By following the procedure as described above, the angle of the camera 2 can be secured as the difference between necessary photographing angles and therefore the focal length can be securely measured.

The distance H between the camera 2 and the two-dimensional chart can be determined from the focal length f of the zoom camera. For example, in cases where the focal distance of the zoom camera is equivalent to a 35 mm standard lens, the photographing distance H is about 90 cm. Since the interval d between the first marks provided on the two-dimensional chart is, for example, 20 cm, an angle of about 10 degrees can be secured as the photographing angle, when the photographing direction is tilted from the very front (I) to the upper left (II) or the like.

An upper limit of the tilt angle of the photographing direction is determined according to the focal depth or the like. In other words, when the tilt angle of the photographing direction is large, the distances between the camera 2 and the respective first marks differ greatly, resulting in blurred images of the first marks in the resulting image. Therefore, the upper limit of the tilt angle of the photographing direction is set, for example, to 30 degrees. The actual photographing procedure is as described above in (I)-(V). Photographing such that the first marks and the second marks are distributed all over the camera screen naturally satisfies the conditions above, and hence satisfies the conditions of the photographing distance and position.

Figure 10:
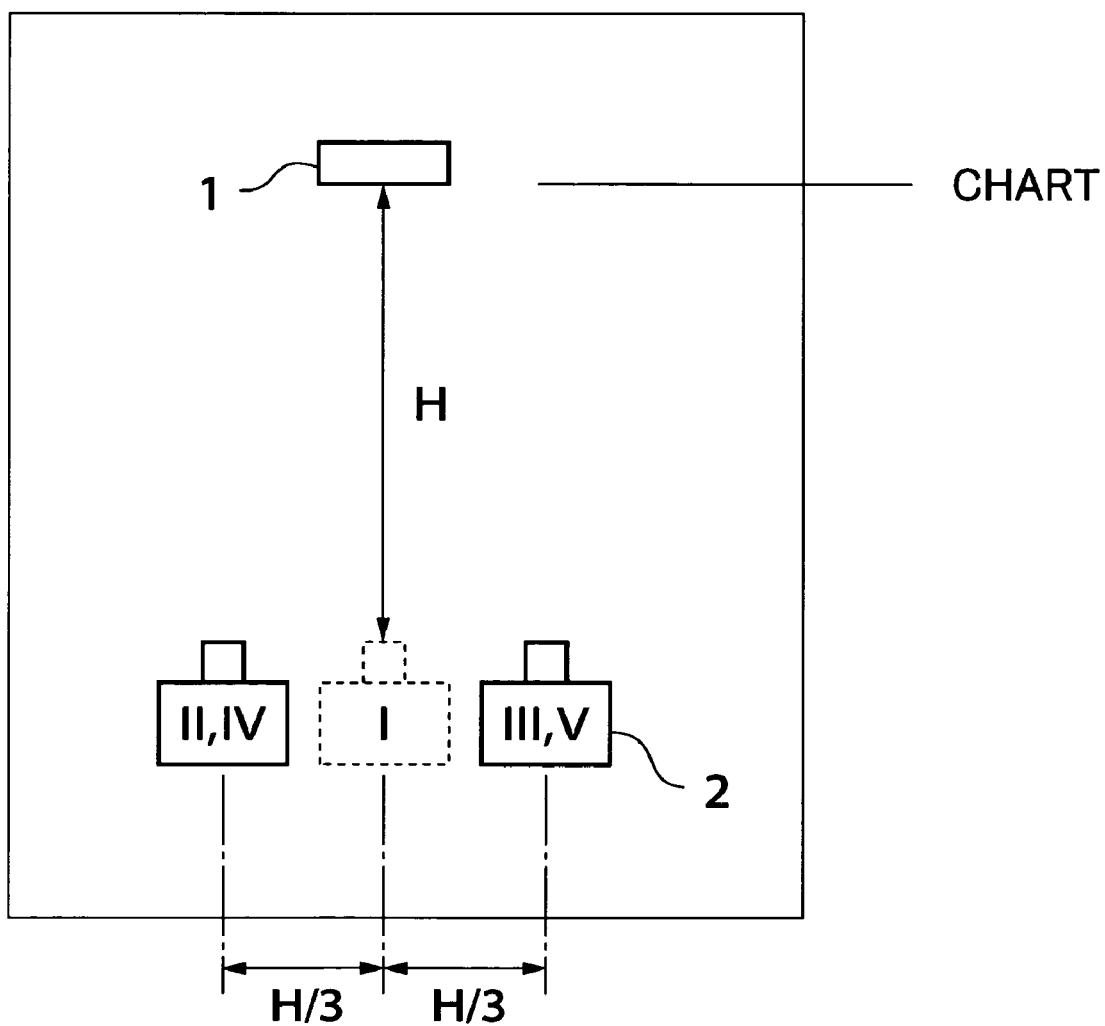
FIG. 10 is a diagram showing camera intervals when measuring the lens aberrations at a focal length equivalent to a standard lens or a telephoto lens.

FIG. 10 is a diagram showing camera intervals when measuring the lens aberrations at a focal length equivalent to a standard lens or a telephoto lens. In cases where the focal length is equivalent to a standard lens or a telephoto lens, the narrow field angle of the photographing lens does not allow a large difference in the photographing angle. Therefore, an angle of 10 degrees cannot be secured as the photographing angle, when the photographing direction is tilted from the very front (I) to the upper left (II) or the like. In other words, this is because the interval d between the first marks is only about 20 cm while the photographing distance H between the camera 2 and the two-dimensional chart is 1 m or more, in cases of a long focal length. To deal with this, using the very front camera position as the center, the left camera positions (II) and (IV) and the right camera positions (III) and (V) can be determined. At this time, the camera is positioned about one third of the photographing distance H away from the very front (I) position to the left or the right, to allow photographing from the upper left (II) and the lower left (IV), and the upper right (III) and the lower right (V) as described above. The optical axis of the camera may conform to the direction of a line normal to the two-dimensional chart, or may be directed toward the two-dimensional chart.

In the instruction for calibration photographing described above, five photographing positions, namely the very front (I), the upper left (II), the upper right (III), the lower left (IV), and the lower right (V), are used. However, the number of photographing positions may be two, namely left and right, at minimum, or may be three or more. In cases of the two, left and right, directions, the two-dimensional chart is photographed such that an angle of about 10 degrees can be secured as the photographing angle.

Figure 11:
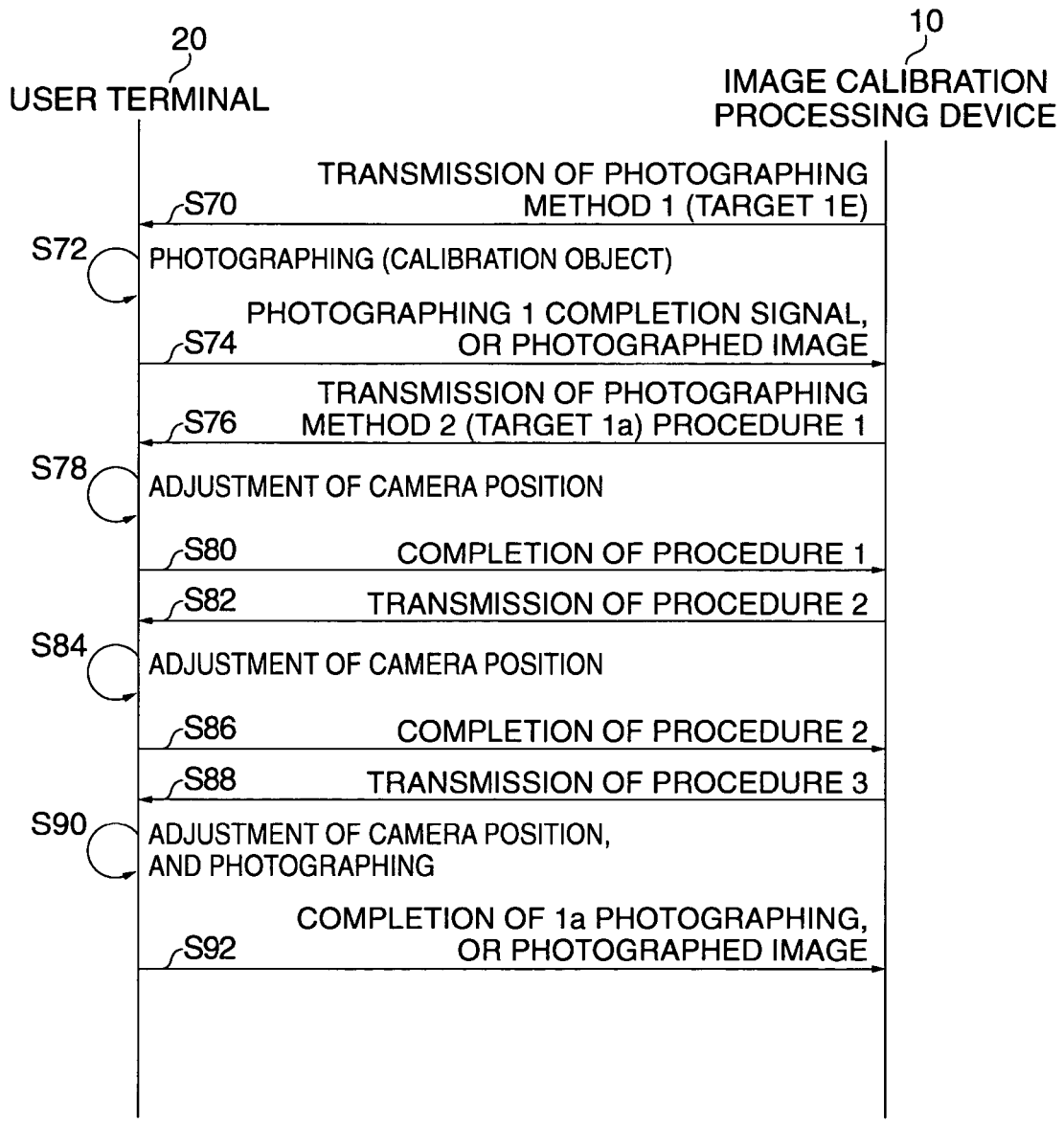
FIG. 11 is a flowchart illustrating an example of a procedure for photographing a calibration object image in accordance with the instructions.

Instructions for calibration photographing are described using a flowchart. FIG. 11 is a flowchart illustrating an example of a procedure for photographing a calibration object image in accordance with the instructions. The figure shows a case where the image calibration processing device 10 and the user terminal 20 transmit and receive the instructions in an interactive manner to photograph a calibration object image. However, the photographing procedures may all be transmitted to a client side at a time in a batch manner, to allow the client to perform photographing while referring to the instructions as appropriate on a computer. Here, a description will be made of a case where the two-dimensional chart is photographed from five directions, namely the very front (I), the upper left (II), the upper right (III), the lower left (IV), and the lower right (V), as shown in FIG. 8.

With respect to the very front (I) direction, a photographing method 1 is transmitted from the image calibration processing device 10 to the user terminal 20 (S70). The photographing method 1 allows photographing in a state shown, for example, in FIG. 9 (A1) and (B1). Preferably, the user terminal 20 displays a simple message indicating the photographing procedure, saying, for example, "Set the camera 2 so that the central first mark 1e comes to the center and the entire two-dimensional chart fills the screen, and then photograph." The user terminal 20 may also display the diagrams of FIG. 9 (A1) and (B1), simultaneously with the message or sequentially upon request from the client. To display the first mark 1e as a photographing target on the display section 25, a switching operation is made to display a photographing target image, to allow photographing. Since photographing will be performed with the two-dimensional chart filling much of the screen, the photographing distance H can naturally be determined according to the field angle of the camera 2.

The first mark 1e on the two-dimensional chart is photographed using the camera 2 (S72). At this time, an operator photographs the calibration object 4 while checking if an image similar to that displayed according to the instruction is seen through a finder (monitor). The image calibration processing device 10 is notified of the completion of photographing the first mark 1e (S74). If the instructions have been downloaded in a batch manner beforehand, a sequential communication at the completion of photographing the first mark 1e is not necessary. If the camera is connected to a computer or if the transmission of a photographed image is not a trouble, the photographed image may be transmitted in S74. Immediate transmission of a calibration object image that has just been photographed will facilitate evaluation of the calibration object image and rephotographing of the calibration object in case of a low photographing quality.

Photographing procedures for the four points on the two-dimensional chart in the respective quadrants, namely the first marks 1a, 1b, 1c, and 1d, are sequentially displayed, to allow photographing of such points while checking, as follows. To photograph the first mark 1a, a procedure 1 of a photographing method 2 is transmitted (S76). For example, FIG. 9 (A2) and (B2), and a message are transmitted, which says, "Now, let's move on to photographing the first mark 1a. First of all, move the camera so that the center of the camera comes to the position of the first mark 1a, while keeping the photographing distance. The moving distance should be about one third of the photographing distance." In response, the user changes the photographing arrangement of the calibration object 4 and the camera 2 to an arrangement as shown in FIG. 9 (B2), and checks if an image seen through the finder is similar to that according to the message (S78). A completion signal of the procedure 1 is transmitted from the user terminal 20 to the image calibration processing device 10 (S80).

A procedure 2 is transmitted from the image calibration processing device 10 (S82). As for FIG. 9 (A3) and (B3), a message is transmitted, which says, "Then, direct the camera so that the first mark 1e in the center position comes to the center, while keeping the camera in the same photographing position." In response, the user changes the photographing arrangement of the calibration object 4 and the camera 2 to an arrangement as shown in FIG. 9 (B3), and checks if an image seen through the finder is similar to that according to the message (S84). A procedure 2 completion signal is transmitted from the user terminal 20 to the image calibration processing device 10 (S86).

A procedure 3 is transmitted from the image calibration processing device 10 (S88). As for FIG. 9 (A4) and (B4), a message is transmitted, which says, "Finally, move the camera forward so that the targets are filled in the entire screen, while keeping the first mark 1e at the center. And press the shutter button." In response, the user changes the photographing arrangement of the calibration object 4 and the camera 2 to an arrangement as shown in FIG. 9 (B4), and checks if an image seen through the finder is similar to that according to the message (S90). A photographing completion signal for the first mark 1e is transmitted from the user terminal 20 to the image calibration processing device 10 (S92). The resulting image may be transmitted in S92, in which case the image can be evaluated to allow retransmitting of a photographing method. In such a case, procedures similar to those in S18, S20, S22, and S24 of FIG. 2 are taken.

The other three first marks 1b, 1c, and 1d on the two-dimensional chart are respectively subjected to procedures 1-3 of photographing methods 3-5, which are similar to the procedures 1-3 of the photographing method 2 for the first mark 1a, in procedures similar to those in S76-S92 of FIG. 11.

Second Embodiment

Figure 12:
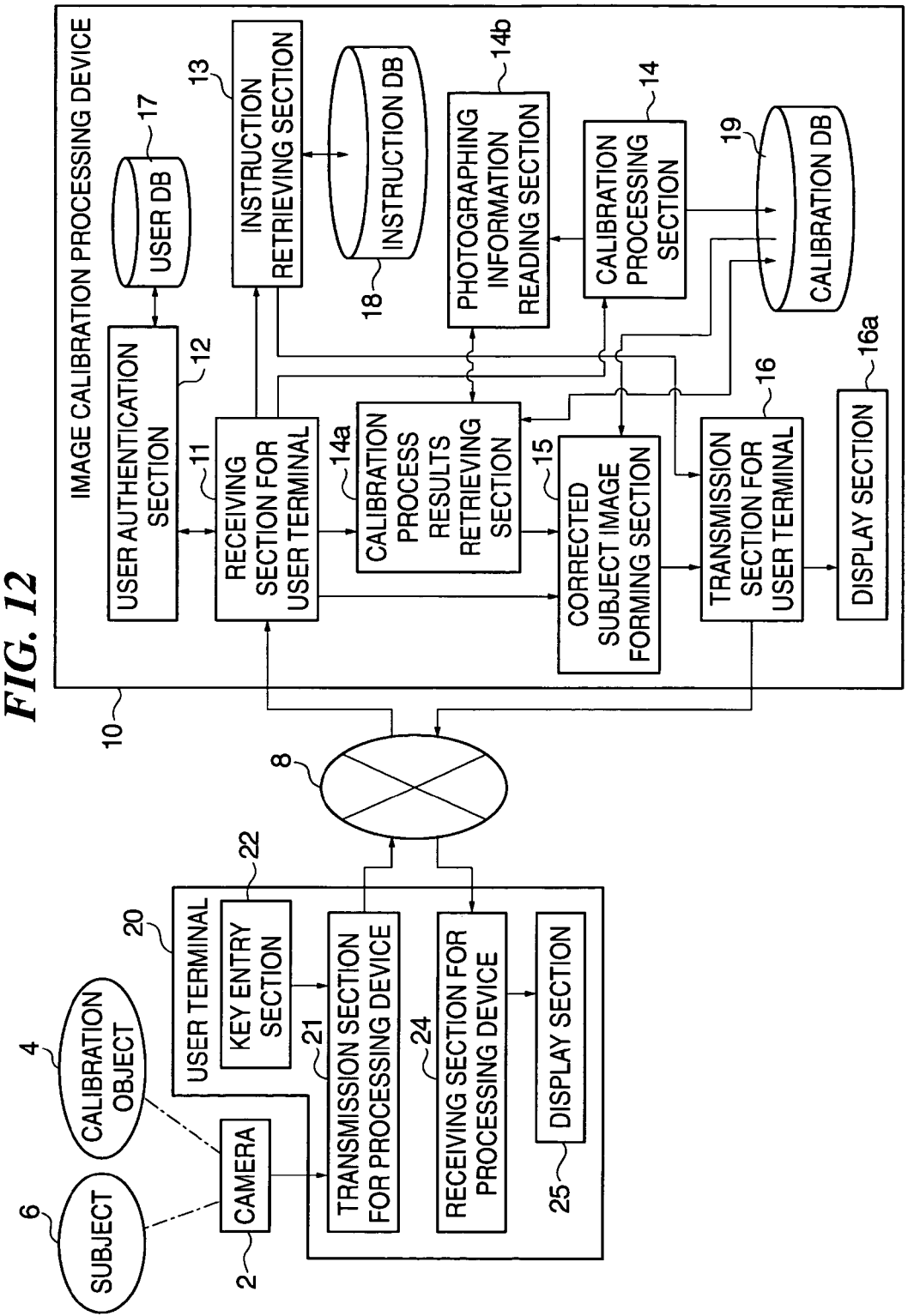
FIG. 12 is a general block diagram illustrating the structure of a second embodiment of the present invention.

FIG. 12 is a general block diagram illustrating the structure of a second embodiment of the present invention. In FIG. 12, components having the same functions as those in FIG. 1 described above are given the same reference numerals and symbols, and descriptions of such components will not be repeated. The image calibration processing device 10 includes a calibration process results retrieving section 14a, in addition to the calibration processing section 14 and the calibration database 19. The calibration process results retrieving section 14a retrieves, from the calibration database 19, results of the calibration process corresponding to the model of the camera received, utilizing the results of the calibration process accumulated in the calibration database 19 according to the camera model data. In cases where normal values are required in terms of precision for the corrected subject image, the results of the calibration process accumulated in the calibration database 19 can be utilized to substitute for the calibration process performed by the calibration processing section 14 on the specific camera 2.

Figure 13:
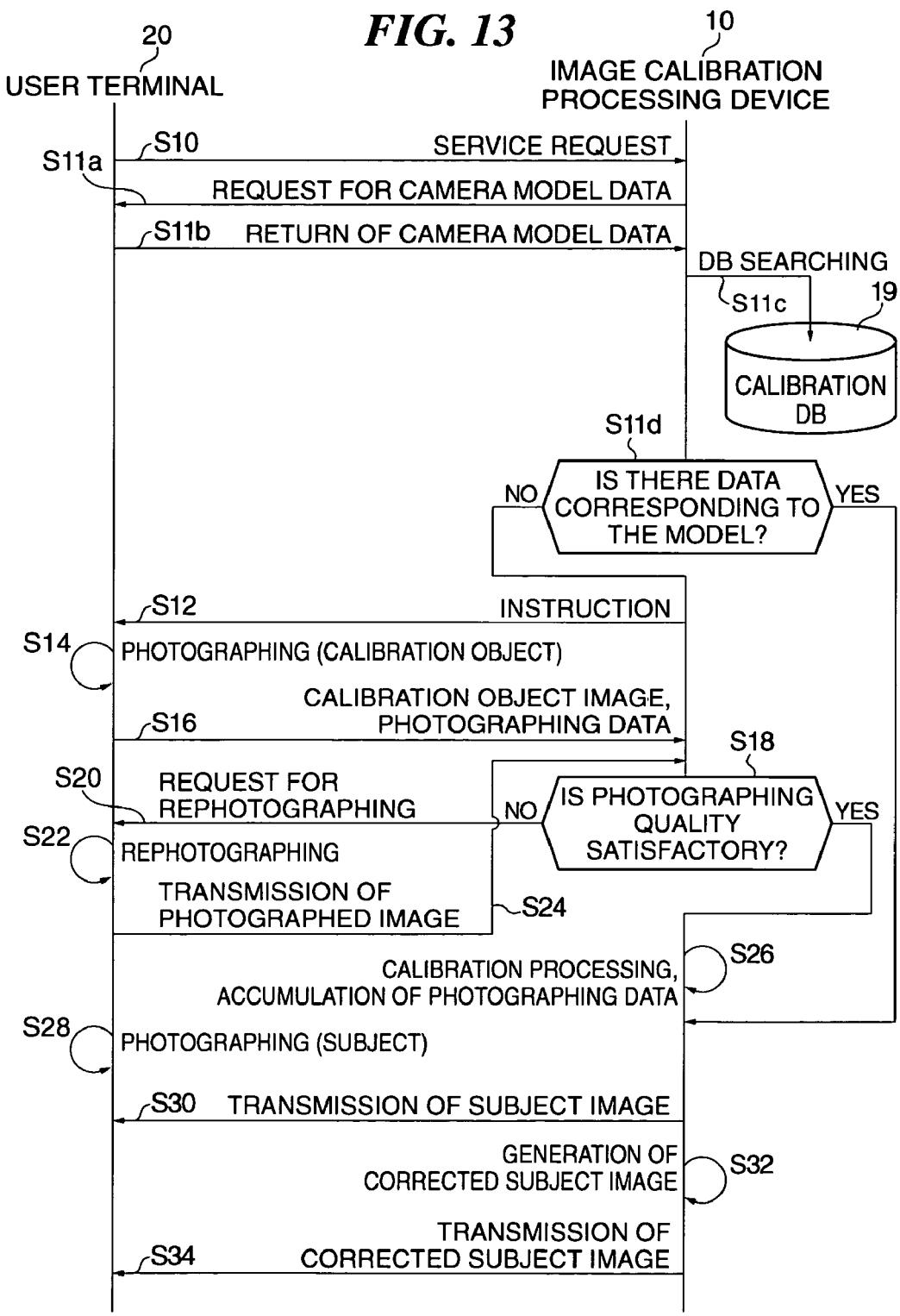
FIG. 13 is a flowchart for illustrating a method of the second embodiment of the present invention.

The operation of an apparatus constituted as described above will be described. FIG. 13 is a flowchart for illustrating a method of the second embodiment of the present invention. A user terminal 20 transmits a calibration request (service request) for the camera 2 to the image calibration processing device 10 via the communication line 8 (S10). When the user of the user terminal 20 is certified as having a proper title for use as a result of authentication, the image calibration processing device 10 requests model data on the camera 2 (S11a). The user terminal 20 side acquires the model data on the camera 2, by allowing entry using the key entry section 22, using an identification function for the camera 2 provided in the user terminal 20, or the like, to transmit the acquired model data to the image calibration processing device 10 via the communication line 8 (S11b). The calibration process results retrieving section 14a searches the results of the calibration process stored in the calibration database 19, to retrieve the corresponding model data on the camera (S11c).

If the calibration process results retrieving section 14a has been able to retrieve the corresponding model data on the camera, the process proceeds to S28. At this time, it may be advantageous to consider variations in the results of the calibration process for the model data on the camera retrieved from the calibration database 19. For example, in cases where a high precision is required in the corrected subject image, the process may be configured to proceed to S28 only when the obtained results of the calibration process satisfy the required precision. The descriptions of S28-S34 have already been made in relation to FIG. 2, and therefore are not repeated here.

On the other hand, if the calibration process results retrieving section 14a has been unable to retrieve the corresponding model data on the camera in S11d, the process proceeds to S12, where a calibration object image is photographed using the camera 2 to acquire results of the calibration process suitable for the specific camera 2. The descriptions of S12-S26 have already been made in relation to FIG. 2, and therefore are not repeated here.

According to the second embodiment of the present invention, the results of the calibration process are accumulated in the calibration database 19, and results of the calibration process corresponding to the model data on the camera are retrieved and transmitted to the user terminal, upon request from the user. Thus, the second embodiment of the present invention provides a significantly convenient method that allows the user to acquire intended results of the calibration process, even without the need to photograph a calibration object image. In the image calibration processing device 10, by accumulating results of the calibration process in the calibration database 19, the model data on cameras to be supported can be enhanced due to the cumulative effect, thereby improving the efficiency.

Third Embodiment

Figure 14:
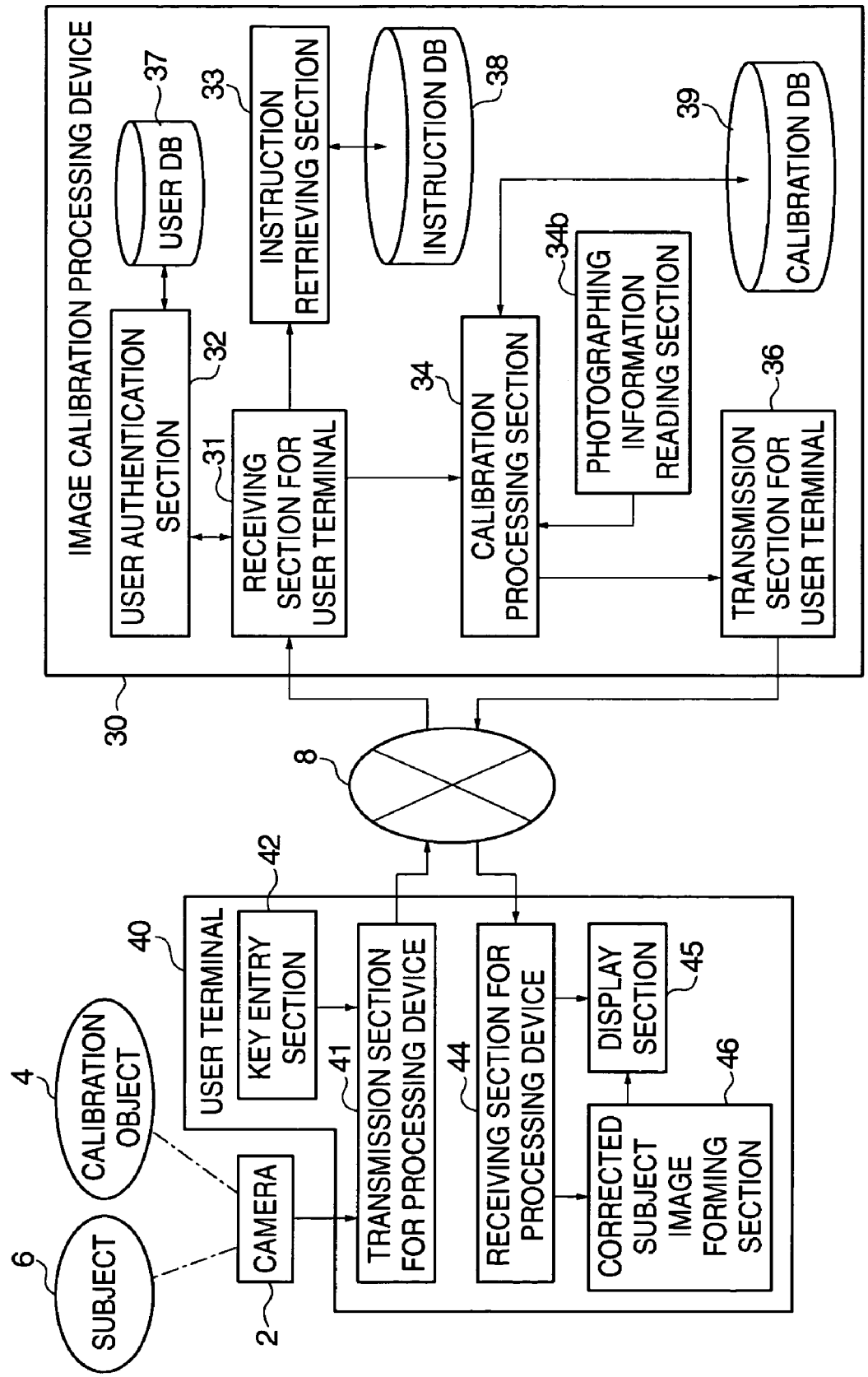
FIG. 14 is a general block diagram illustrating the structure of a third embodiment of the present invention.

FIG. 14 is a general block diagram illustrating the structure of a third embodiment of the present invention. The third embodiment is different, compared with the first embodiment, in that the corrected subject image forming section is provided on the user terminal 40 side. In other words, the image calibration processing device 30 is configured that the results of the calibration process calculated by the calibration processing section 34 are transmitted from the transmission section for user terminal 36 to the user terminal 40. The user terminal 40 is provided with a corrected subject image forming section 46 for processing a subject image into a corrected subject image. For descriptions of components of the third embodiment shown in FIG. 14, the descriptions of those of the first embodiment shown in FIG. 1 with the same names should be referred to, as long as the natures of the two counterparts will not contradict, and the detailed description will not be repeated.

As shown in the figure, the image calibration processing device 30 includes a receiving section for user terminal 31, a user authentication section 32, an instruction retrieving section 33, a calibration processing section 34, an information reading section 34b, a transmission section for user terminal 36, a display section 36a, a user database 37, an instruction database 38, and a calibration database 39. The image calibration processing terminal 40 includes a transmission section for processing device 41, a key entry section 42, a receiving section for processing device 44, a display section 45, and a corrected subject image forming section 46.

Figure 15:
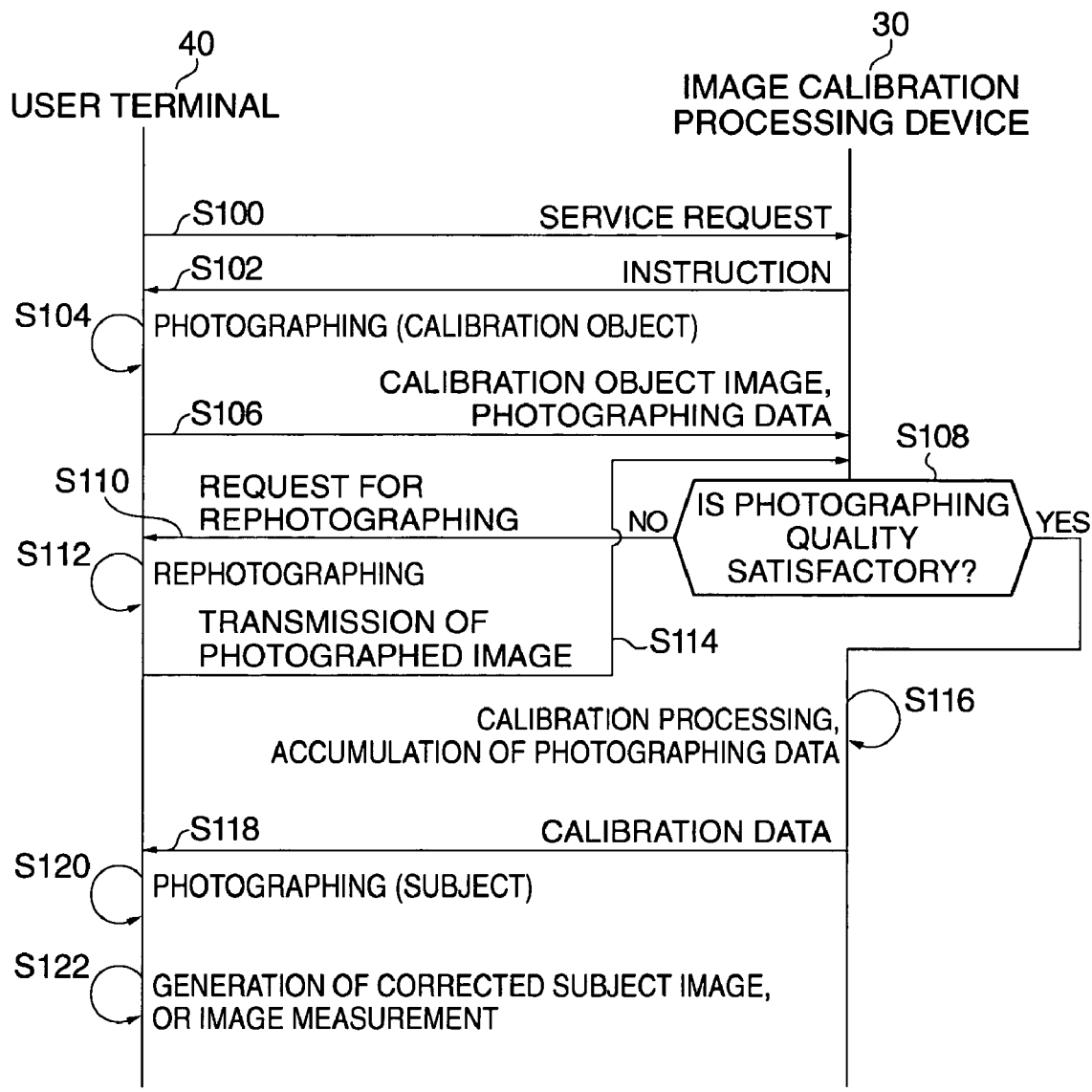
FIG. 15 is a flowchart for illustrating a method of the third embodiment of the present invention.

The operation of an apparatus constituted as described above will be described. FIG. 15 is a flowchart for illustrating a method of the third embodiment of the present invention. A user terminal 40 transmits a calibration request (service request) for the camera 2 to the image calibration processing device 30 via the communication line 8 (S100). In response to the calibration request, the image calibration processing device 30 authenticates whether or not a user of the user terminal 40 has a proper title for use. When the user of the user terminal 40 is certified as having a proper title for use as a result of authentication, the image calibration processing device 30 returns an instruction for calibration photographing according to the model of the camera 2 to the user terminal 40 (S102).

On the user terminal 40 side the calibration object 4 is photographed by the camera 2, in accordance with the instruction for calibration photographing (S104). The calibration object image photographed is transmitted from the user terminal 40 to the image calibration processing device 30 via the communication line 8, together with the photographing data (S106). The image calibration processing device 30 makes a determination on the photographing quality of the calibration object image transmitted, for example, as to whether or not the image is unsuitable for the calibration process because the image is out of focus or the calibration object 4 image is too small (S108). If the calibration object image is determined to be unsuitable, rephotographing of the calibration object 4 by the camera 2 is requested (S110). In response to the request for rephotographing, the user photographs the calibration object 4 by the camera 2 (S112), while paying attention to what is suggested in the comment. The calibration object image photographed is transmitted from the user terminal 40 to the image calibration processing device 30 via the communication line 8, together with the photographing data (S114), and a determination is made on the photographing quality of the calibration object image in S108.

If the photographing quality of the calibration object image is suitable, the calibration processing section 14 performs a calibration process using the calibration object image received (S116). The results of the calibration process are accumulated in the calibration database 19, together with the model of the camera. The model of the camera is acquired, for example, by reading the photographing state information attached to the calibration object image in the information reading section 14b. The image calibration processing device 30 returns the results of the calibration process obtained in S116 to the user terminal 40 (S118).

On the user terminal 40 side the subject 6 is photographed by the camera 2 used to photograph the calibration object image (S120). The user terminal 40 performs a calibration on the subject image in accordance with the results of the calibration process receiving the subject image, to form a corrected subject image (S122). The corrected subject image formed may be, for example, displayed on the display section 45, printed on a paper medium, or accumulated in an electromagnetic storage medium.

Fourth Embodiment

Figure 16:
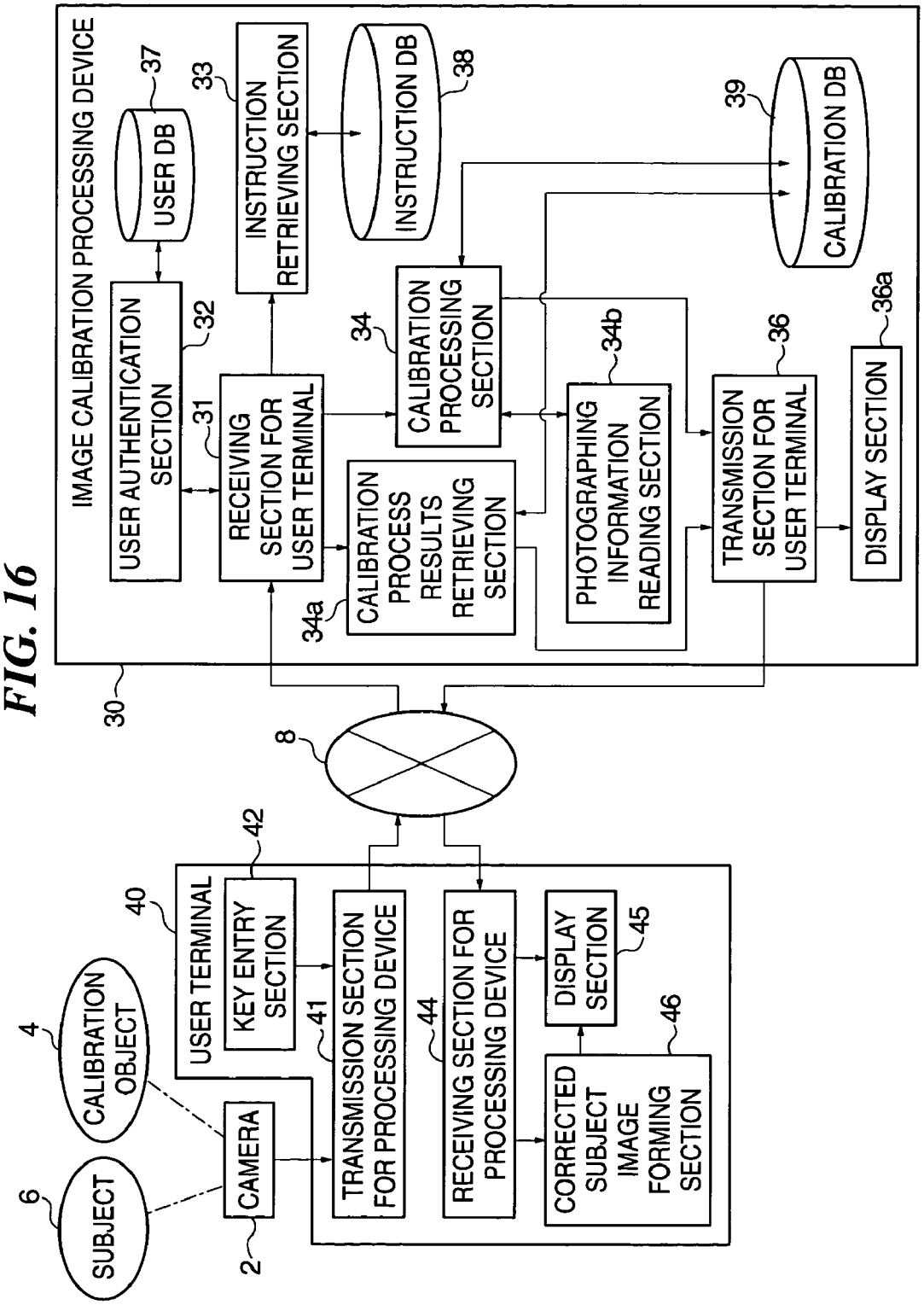
FIG. 16 is a general block diagram illustrating the structure of a fourth embodiment of the present invention.

FIG. 16 is a general block diagram illustrating the structure of a fourth embodiment of the present invention. In FIG. 16, components having the same functions as those in FIG. 1, FIG. 12, and FIG. 14 described above are given the same reference numerals and symbols, and descriptions of such components will not be repeated. The image calibration processing device 30 includes a calibration process results retrieving section 34a, in addition to the calibration processing section 34 and the calibration database 39. The corrected subject image forming section 46 is provided on the user terminal 40 side, and not in the image calibration processing device 30. The calibration process results retrieving section 34a retrieves, from the calibration database 39, results of the calibration process corresponding to the model of camera received, utilizing the results of the calibration process accumulated in the calibration database 39 according to the camera model data.

Figure 17:
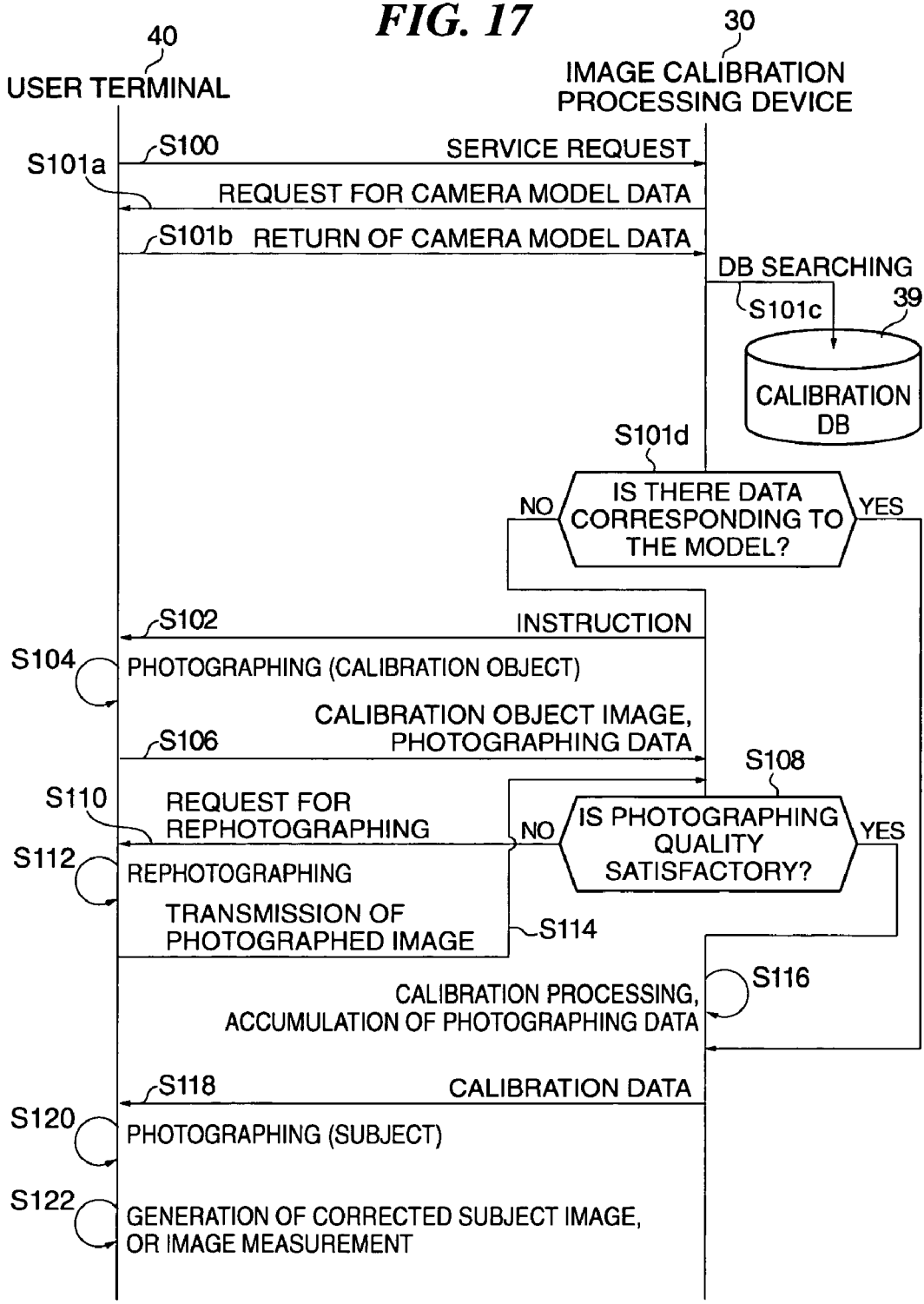
FIG. 17 is a flowchart for illustrating a method of the fourth embodiment of the present invention.

The operation of an apparatus constituted as described above will be described. FIG. 17 is a flowchart for illustrating a method of the fourth embodiment of the present invention. A user terminal 40 transmits a calibration request (service request) for the camera 2 to the image calibration processing device 30 via the communication line 8 (S100). When a user of the user terminal 40 is certified as having a proper title for use as a result of authentication, the image calibration processing device 30 requests model data on the camera 2 (S101a). The user terminal 40 side acquires the model data on the camera 2, by allowing entry using the key entry section 22, using an identification function for the camera 2 provided in the user terminal 40, or the like, to transmit the acquired model data to the image calibration processing device 30 via the communication line 8 (S101b). The calibration process results retrieving section 34a searches the results of the calibration process stored in the calibration database 39, to retrieve the corresponding model data on the camera (S101c).

If the calibration process results retrieving section 34a has been able to retrieve the corresponding model data on the camera, the process proceeds to S118. The descriptions of S118-S122 have already been made in relation to FIG. 15, and therefore are not repeated here.

On the other hand, if the calibration process results retrieving section 34a has been unable to retrieve the corresponding model data on the camera in S101d, the process proceeds to S112, where a calibration object image is photographed using the camera 2 to acquire results of the calibration process suitable for the specific camera 2. The descriptions of S112-S116 have already been made in relation to FIG. 15, and therefore are not repeated here.

Fifth Embodiment

Figure 18:
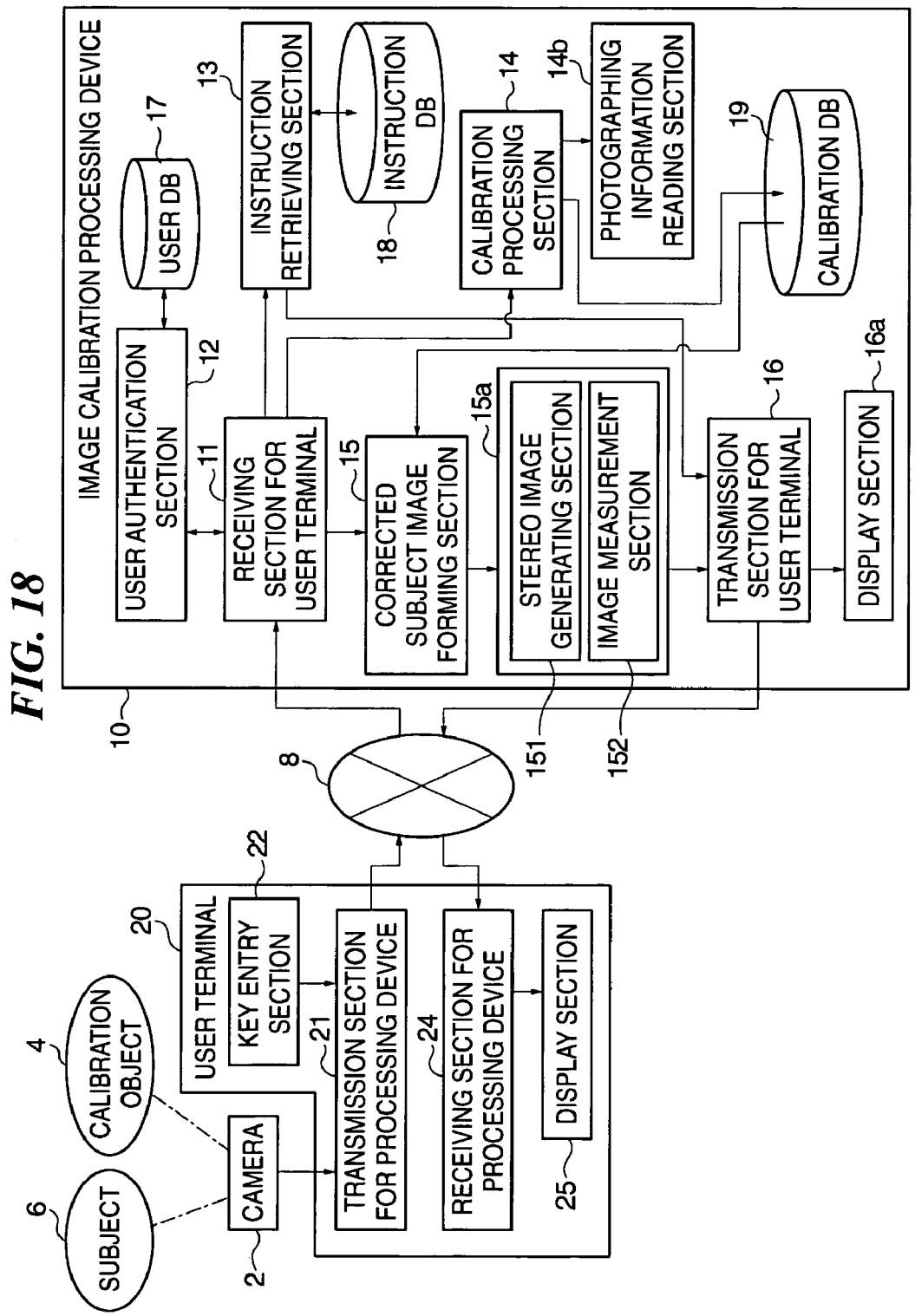
FIG. 18 is a general block diagram illustrating the structure of a fifth embodiment of the present invention.

FIG. 18 is a general block diagram illustrating the structure of a fifth embodiment of the present invention. In FIG. 18, components having the same functions as those in FIG. 1 described above are given the same reference numerals and symbols, and descriptions of such components will not be repeated. In this embodiment, the camera 2 photographs the calibration object 4 and the subject 6 as one image, and the user terminal 20 deals with a resulting stereo image photographed from at least two, namely left and right, photographing directions. The image calibration processing device 10 is provided with a three-dimensional measurement section 15a between the corrected subject image forming section 15 and the transmission section for user terminal 16.

The three-dimensional measurement section 15a includes a stereo image generating section 151 and an image measurement section 152. The stereo image generating section 151 has a function of generating a rectified image by performing an orientation (relative orientation and absolute orientation) and a rectification on the stereo image photographed by the camera 2. Typically, the stereo image generating section 151 comprises a computer-executable software program. Here, the rectified image refers to a pair of images photographed in stereo from the right and left photographing directions and subjected to a rectification and an adjustment so as to be viewed stereoscopically. The image measurement section 152 performs a so-called absolute orientation on the stereo image generated by the stereo image generating section 151, to calculate ground coordinates of each pixel. The details of this processing are disclosed, for example, in JP-A-Hei 11-351865. The use of the image measurement section 152 allows accurate measurement of a three-dimensional shape such as projections and depressions on the measuring object 30 surface.

Figure 19:
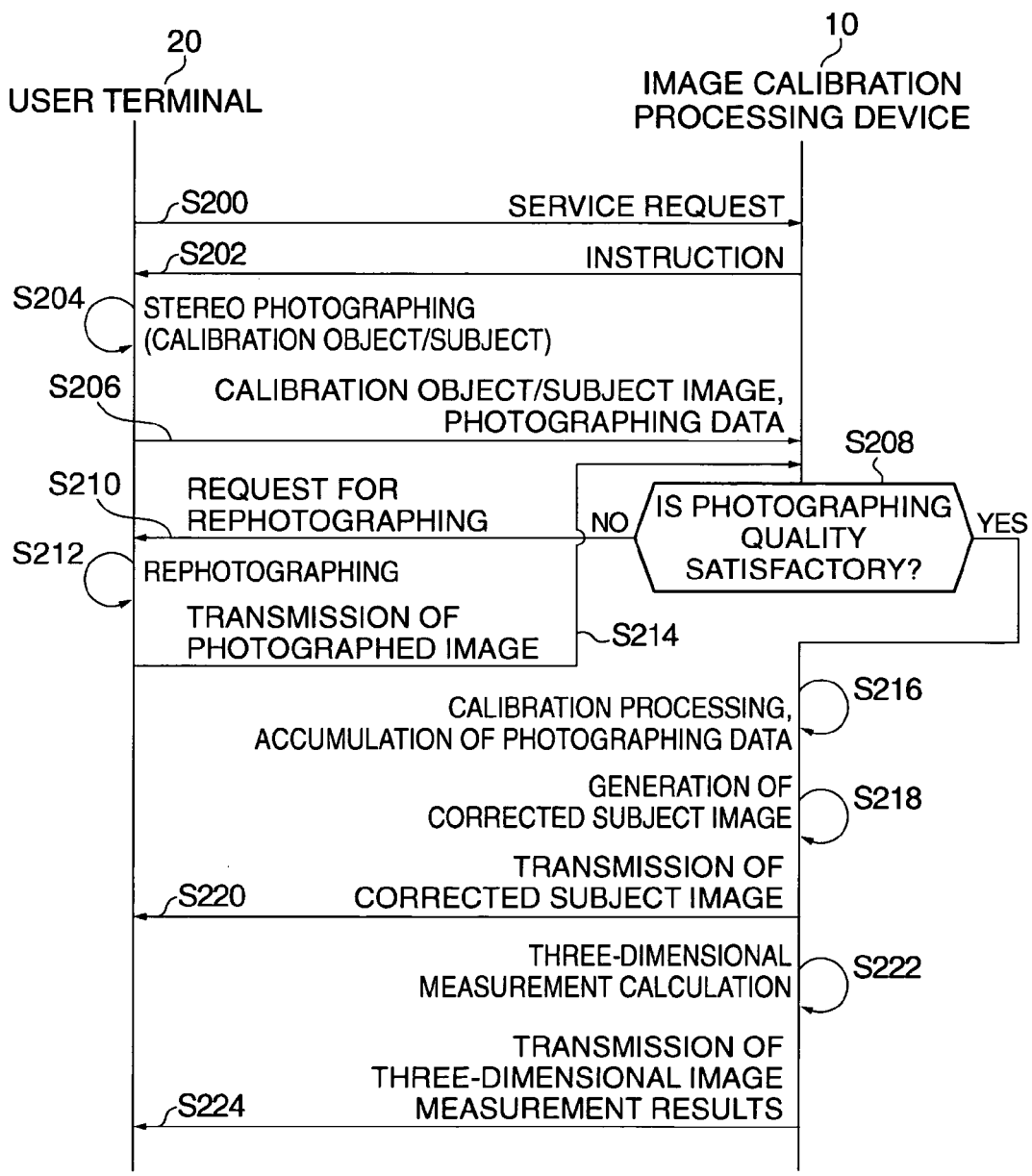
FIG. 19 is a flowchart for illustrating a method of the fifth embodiment of the present invention.

The operation of an apparatus constituted as described above will be described. FIG. 19 is a flowchart for illustrating a method of the fifth embodiment of the present invention. A user terminal 20 transmits a calibration request (service request) for the camera 2 to the image calibration processing device 10 via the communication line 8 (S200). The calibration request includes a request for a three-dimensional image measurement on the subject 6 using a stereo image. In response, the image calibration processing device 10 authenticates whether or not a user of the user terminal 20 has a proper title for use. When the user of the user terminal 20 is certified as having a proper title for use as a result of authentication, the image calibration processing device 10 returns an instruction for calibration photographing according to the model of the camera 2 to the user terminal 20 (S202). The instruction for calibration photographing includes important notices in a three-dimensional image measurement on the subject 6 using a stereo image.

On the user terminal 20 side the calibration object 4 and the subject 6 is photographed in stereo at a time so as to be included in one image, by the camera 2, in accordance with the instruction for calibration photographing (S204). This photographing in stereo yields a pair of images photographed in stereo from the right and left photographing directions using the camera 2. The calibration object/subject image photographed in stereo is transmitted from the user terminal 20 to the image calibration processing device 10 via the communication line 8, together with the photographing data (S206).

The image calibration processing device 10 makes a determination on the photographing quality of the calibration object/subject image transmitted, for example, as to whether or not the image is unsuitable for the calibration process because the image is out of focus or the calibration object 4 image is too small (S208). If the calibration object/subject image is determined to be unsuitable, rephotographing of the calibration object 4 and the subject 6 by the camera 2 is requested (S210). At this time, it should be advantageous to give a comment suggesting to what should be paid attention in order to obtain a calibration object/subject image suitable for the calibration process. In response to the request for rephotographing, the user photographs the calibration object 4 and the subject 6 by the camera 2 (S212), while paying attention to what is suggested in the comment. The calibration object/subject image photographed is transmitted from the user terminal 20 to the image calibration processing device 10 via the communication line 8, together with the photographing data (S214), and a determination is made on the photographing quality of the calibration object/subject image in S208.

If the photographing quality of the calibration object/subject image is suitable, the calibration processing section 14 performs a calibration process using the calibration object 4 image included in the calibration object/subject image received (S216). The results of the calibration process are accumulated in the calibration database 19, together with the model of the camera. On the user terminal 20 side a corrected subject image is generated from the calibration object/subject image (S218), and is transmitted to the user terminal 20 via the communication line 8 (S220). In addition, in the image calibration processing device 10, the three-dimensional measurement section 15a performs a three-dimensional measurement on the corrected subject image. The three-dimensional measurement results obtained are returned from the image calibration processing device 10 to the user terminal 20 (S224). At this time, the corrected subject image may be converted into an ortho image and then returned from the image calibration processing device 10 to the user terminal 20. The foregoing description is directed to a case where a three-dimensional measurement is performed by a stereo method using two images. However, various methods may alternatively be adopted, such as a single-photograph orientation method using a single image in which the calibration object 4 and the subject 6 are photographed, or a bundle adjusting method with self-calibration using a plurality of images.

Sixth Embodiment

Figure 20:
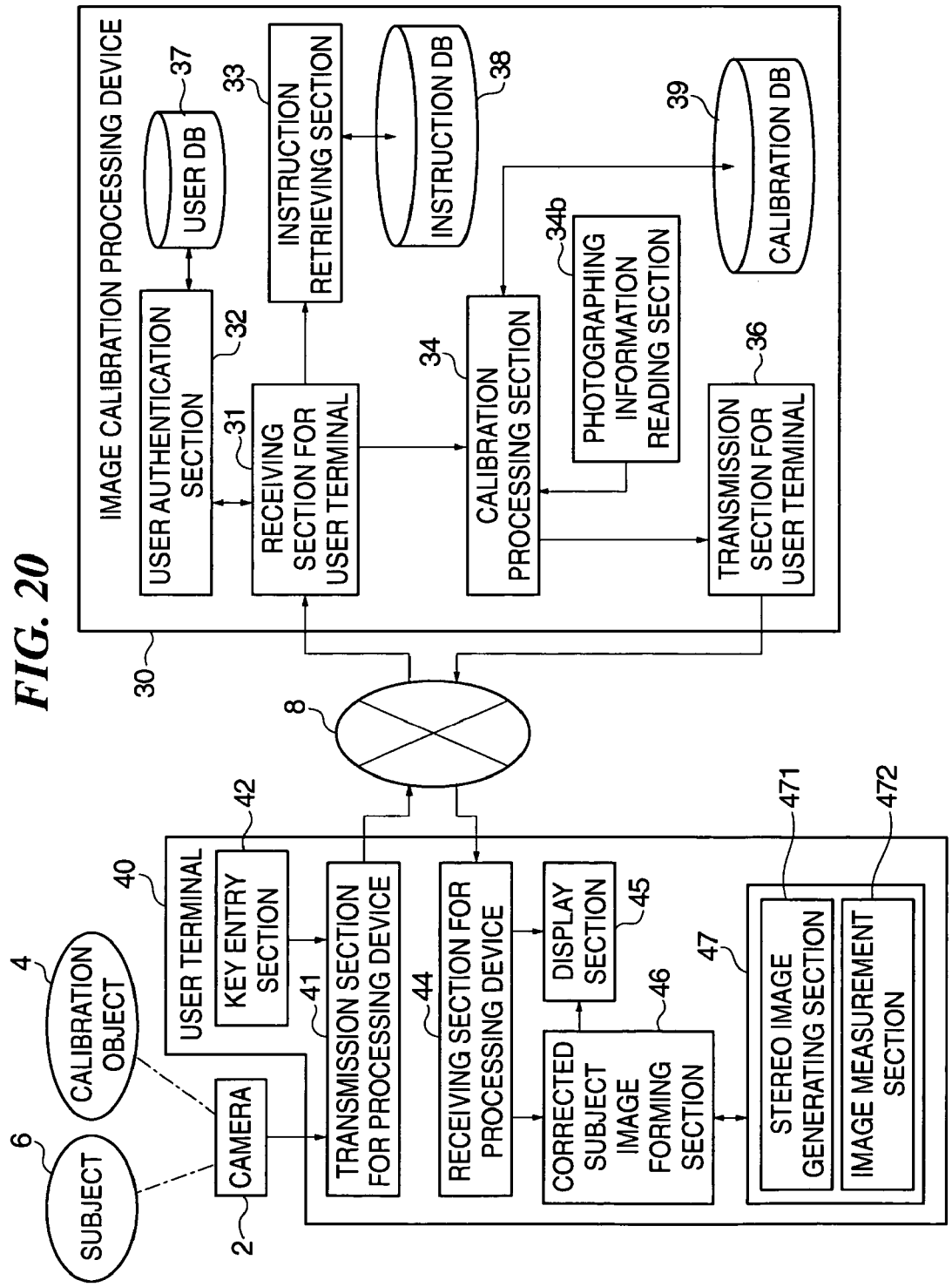
FIG. 20 is a general block diagram illustrating the structure of a sixth embodiment of the present invention.

FIG. 20 is a general block diagram illustrating the structure of a sixth embodiment of the present invention. In FIG. 20, components having the same functions as those in FIG. 18 described above are given the same reference numerals and symbols, and descriptions of such components will not be repeated. In this embodiment, the three-dimensional measurement section is provided on the user terminal 40 side, and not in the image calibration processing section 30. The three-dimensional measurement section 47 includes a stereo image generating section 471 and an image measurement section 472. For descriptions of the stereo image generating section 471 and the image measurement section 472, the descriptions of the stereo image generating section 151 and the image measurement section 152 should be referred to.

Figure 21:
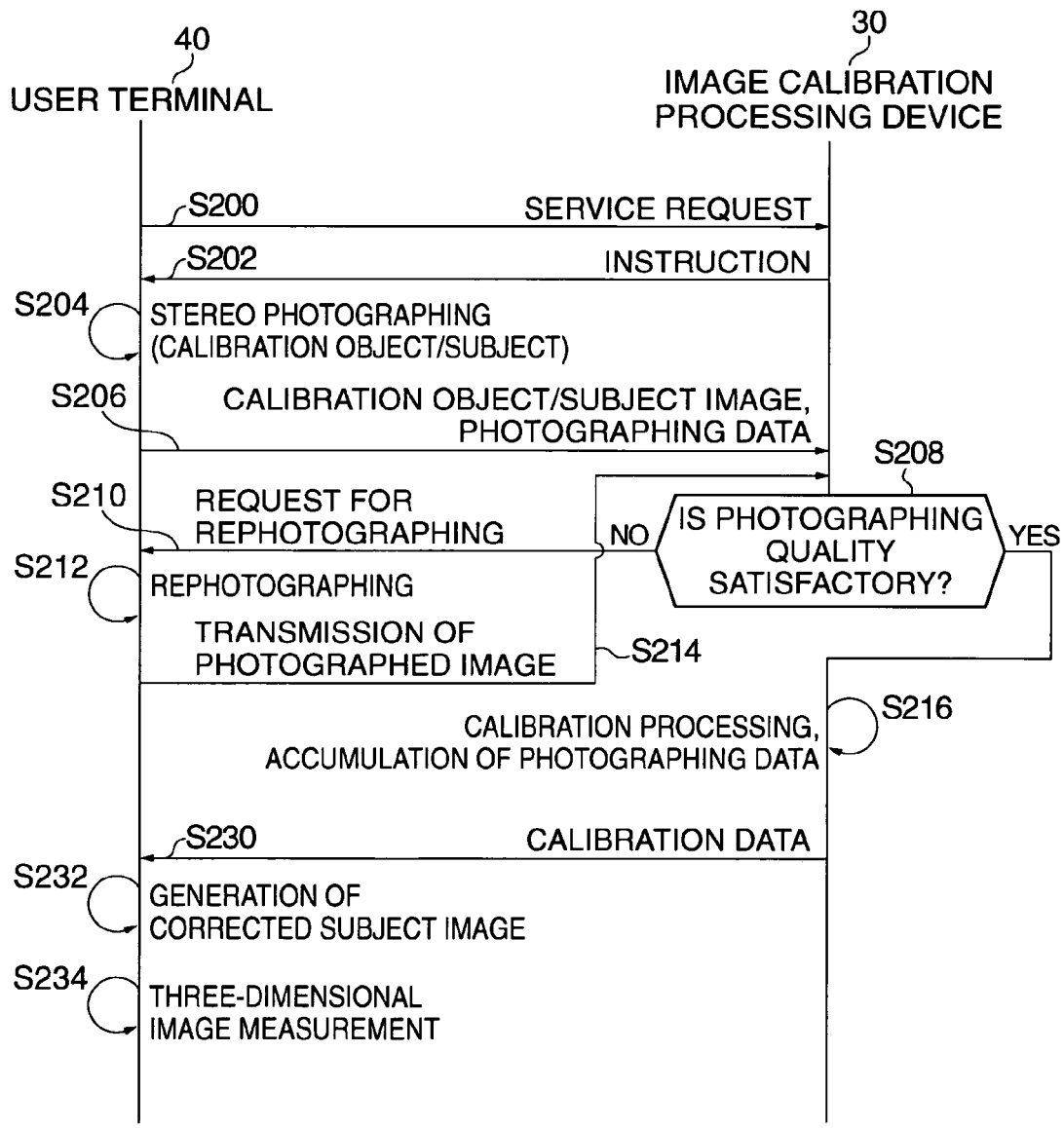
FIG. 21 is a flowchart for illustrating a method of the sixth embodiment of the present invention.

The operation of an apparatus constituted as described above will be described. FIG. 21 is a flowchart for illustrating a method of the sixth embodiment of the present invention. Descriptions of S200-S216 of FIG. 21 are the same as those of S200-S216 of FIG. 19, and therefore will not be repeated. The results of the calibration process in S216 are accumulated in the calibration database 19, together with the model of the camera, and transmitted to the user terminal 40 (S230). The user terminal 40 uses the results of the calibration process transmitted, to generate a corrected subject image from the calibration object/subject image (S232). In addition, in the user terminal 40, the three-dimensional measurement section 47 performs a three-dimensional measurement on the corrected subject image (S234). At this time, the corrected subject image may be converted into an ortho image. The corrected subject image may be, for example, displayed on the display section 45 of the user terminal 40, displayed on a television set for stereo display, or the like.

The bundle adjusting method with self-calibration used in the first through sixth embodiments is described. The calibration processing performed by the calibration processing section 14, 34 uses a "bundle adjusting method with self-calibration" used in the field of photogrammetry for example. The term "bundle adjusting" refers to a method of adjusting the position and the tilt of the camera (exterior orientation elements) and the coordinate positions of the second marks at the same time, by establishing observation equations for every ray bundle of each image based on a collinearity condition that a ray bundle connecting a subject, a lens, and a CCD surface must be collinear, and applying a least squares method. The term "with self-calibration" indicates that the calibration elements, namely interior localizations of the camera (lens aberrations, principal point, and focal length) can also be found with the method. The basic equations of the collinear condition for the bundle adjusting method with self-calibration (hereinafter referred to as "bundle adjusting method" for simplicity) are represented by (Equation 2) and (Equation 3) as follows:

$$x = -c \frac{a_{11}(X - X_0) + a_{12}(Y - Y_0) + a_{13}(Z - Z_0)}{a_{31}(X - X_0) + a_{32}(Y - Y_0) + a_{33}(Z - Z_0)} + \Delta x \quad (2)$$

$$y = -c \frac{a_{21}(X - X_0) + a_{22}(Y - Y_0) + a_{23}(Z - Z_0)}{a_{31}(X - X_0) + a_{32}(Y - Y_0) + a_{33}(Z - Z_0)} + \Delta y \quad (3)$$

Here, the elements $a_{11}$-$a_{33}$ are elements of a rotation matrix at a camera tilt ($\omega, \phi, \kappa$). The symbols $\omega, \phi, \kappa$ represent the tilts of the camera at the time of photographing with respect to the three axes X, Y, Z constituting the object coordinate system, and are called exterior orientation elements. (X, Y, Z) represents coordinates of an object such as a reference mark in the object coordinate system, and ($X_0, Y_0, Z_0$) represents coordinates of a projection center point Oc. (See the specification of Japanese Patent Application No. 2002-195058, paragraphs [0052], [0056], and [0068].) The bundle adjusting method is used to perform a least squares approximation using (Equation 2) and (Equation 3) with a plurality of images to find various solutions. The bundle adjusting method allows calculating the exterior orientation elements of the camera at respective photographing positions at the same time. In other words, the method allows calculation of the calibration elements of the camera.

As an example of a correction model for the interior localizations (lens aberrations), radial lens distortions can be represented by (Equation 4) as follows:

$$\begin{cases} \Delta x = x_0 + x(k_1 r^2 + k_2 r^4) \\ \Delta y = y_0 + y(k'_1 r^2 + k_2 r^4) \\ r^2 = (x^2 + y^2)/c^2 \end{cases} \quad (4)$$

$k_1, k_2$: radial lens distortion

The correction model is not limited to this example, but may be selected as suitable for the lens used. Such calculations can be made with a successive approximation method, if six or more reference points are available in the ground coordinate system and the image coordinate system.

Calculation of lens aberrations using a two-dimensional chart shown in FIG. 3 as the calibration object 4 is already disclosed in the specification of Japanese Patent Application No. 2002-195058 proposed by the present applicant, or the like. The specifics of the calculation of lens aberration using a two-dimensional chart are hardly related to the subject of the present invention, and therefore the specification is incorporated herein by reference in order to avoid redundancy. As an alternative to the two-dimensional chart as shown in FIG. 3, other types of two-dimensional chart or three-dimensional chart may be used as the calibration object 4. The calibration processing can be performed using the obtained equations for calculating lens aberrations corresponding to the respective charts.

What is claimed is:

1. An image calibration method, comprising the steps of:
   receiving, at an image calibration processing device, a calibration request from a user terminal;
   receiving, at the image calibration processing device, a calibration object image photographed in accordance with an instruction for calibration photographing;
   performing a calibration process using the received calibration object image;
   receiving, at the image calibration processing device, a subject image transmitted from the user terminal and photographed by a camera used to photograph the calibration object image;
   performing a calibration on the subject image in accordance with results of the calibration process to form a corrected subject image; and
   returning the formed corrected subject image from the image calibration processing device to the user terminal.

2. The image calibration method according to claim 1, wherein the calibration object image and the subject image are a common image in which a calibration object and a subject are photographed at a time, and the method further comprising the step of performing a three-dimensional measurement on the subject using the corrected subject image.

3. The image calibration method according to claim 1, including the step of:
   transmitting the instruction for calibration photographing from the image calibration processing device to the user terminal.

4. The image calibration method according to claim 1, including the step of:
   receiving at the image calibration processing device at least a focal length in the photographing and a model of the camera, or a focal length in the photographing and a size of an imaging device used in the photographing, together with the calibration object image transmitted from the user terminal.

5. The image calibration method according to claim 1, including the step of:
   reading, at the image calibration processing device, data necessary for the calibration process from photographing information affixed to the calibration object image transmitted from the user terminal,
   the read data being used for the calibration process.

6. The image calibration method according to claim 1, wherein the results of the calibration process includes at least one of a principal point position, distortion data, and a focal length of a lens used in the photographing, of the camera involved in the photographing of the calibration object image.

7. The image calibration method according to claim 1, including the step of:
   accumulating the calculated results of the calibration process in a calibration database when the image calibration processing device performs the calibration process using the received calibration object image.

8. The image calibration method according to claim 1, including the step of:
   transmitting a calibration object image in accordance with an instruction from the user terminal to the image calibration processing device.

9. An image calibration method, comprising the steps of:
   receiving, at an image calibration processing device, a calibration request from a user terminal;
   receiving, at the image calibration processing device, a calibration object image photographed in accordance with an instruction for calibration photographing;
   performing a calibration process using the received calibration object image; and
   transmitting results of the calibration process from the image calibration processing device,
   wherein the user terminal performs a calibration on a subject image photographed by a camera used to photograph the calibration object image, using the results of the calibration process transmitted from the image calibration processing device, to form a corrected subject image.

10. The image calibration method according to claim 9, wherein the calibration object image and the subject image are a common image in which a calibration object and a subject are photographed at a time, and
   wherein the user terminal is further configured to perform a three-dimensional measurement on the subject using the corrected subject image.

11. The image calibration method according to claim 9, including the step of:

transmitting the instruction for calibration photographing from the image calibration processing device to the user terminal.

12. The image calibration method according to claim 9, including the step of:

receiving at the image calibration processing device at least a focal length in the photographing and a model of the camera, or a focal length in the photographing and a size of an imaging device used in the photographing, together with the calibration object image transmitted from the user terminal.

13. The image calibration method according to claim 9, including the step of:

reading, at the image calibration processing device, data necessary for the calibration process from photographing information affixed to the calibration object image transmitted from the user terminal, the read data being used for the calibration process.

14. The image calibration method according to claim 9, wherein the results of the calibration process includes at least one of a principal point position, distortion data, and a focal length of a lens used in the photographing, of the camera involved in the photographing of the calibration object image.

15. The image calibration method according to claim 9, including the step of:

accumulating the calculated results of the calibration process in a calibration database when the image calibration processing device performs the calibration process using the received calibration object image.

16. The image calibration method according to claim 9, including the step of:

transmitting a calibration object image in accordance with an instruction from the user terminal to the image calibration processing device.

17. An image calibration method for use with an image calibration processing device including a calibration database in which results of a calibration process are accumulated according to a model of a camera, comprising the steps of:

receiving, at the image calibration processing device, a calibration request and a subject image from a user terminal, together with a model of a camera used to photograph the subject image;

retrieving, from the calibration database, results of the calibration process corresponding to the received model of the camera;

performing a calibration on the subject image using the retrieved results of the calibration process to form a corrected subject image; and returning the formed corrected subject image from the image calibration processing device to the user terminal.

18. An image calibration method for use with an image calibration processing device including a calibration database in which results of a calibration process are accumulated according to a model of a camera, comprising the steps of:

receiving, at the image calibration processing device, a calibration request from a user terminal, together with a model of a camera used to photograph a subject image;

retrieving, from the calibration database, results of the calibration process corresponding to the received model of the camera; and transmitting the retrieved results of the calibration process from the image calibration processing device, wherein the user terminal performs a calibration on the subject image using the results of the calibration process transmitted from the image calibration processing device, to form a corrected subject image.

* * * * *